United States Patent
Tamaru et al.

(10) Patent No.: US 6,452,744 B1
(45) Date of Patent: Sep. 17, 2002

(54) MAGNETIC RECORD/PLAYBACK APPARATUS

(75) Inventors: Yoshio Tamaru, Tokyo; Masahiro Kiko, Chiba; Junya Endo, Tokyo; Mutsuko Ochiai, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/427,489

(22) Filed: Oct. 26, 1999

(30) Foreign Application Priority Data

Oct. 27, 1998 (JP) .......................................... 10-305808

(51) Int. Cl.[7] .............................................. G11B 15/60
(52) U.S. Cl. .................................................. 360/130.24
(58) Field of Search ................................. 360/270, 271, 360/271.5, 271.1, 130.22, 130.23, 130.24

(56) References Cited

U.S. PATENT DOCUMENTS

| | | | |
|---|---|---|---|
| 5,220,472 A | * 6/1993 | Okamoto et al. | 360/107 |
| 5,508,945 A | * 4/1996 | Mizoh et al. | 364/563 |
| 5,585,973 A | * 12/1996 | Kim | 386/67 |
| 5,627,705 A | * 5/1997 | Ibaraki et al. | 360/130.24 |
| 6,108,165 A | * 8/2000 | Maruyama et al. | 360/107 |
| 6,125,001 A | * 9/2000 | Honsho et al. | 360/84 |

FOREIGN PATENT DOCUMENTS

| | | |
|---|---|---|
| JP | 01260658 | * 10/1989 |
| JP | 03224156 | * 10/1991 |

* cited by examiner

*Primary Examiner*—David Hudspeth
*Assistant Examiner*—Angel Castro
(74) *Attorney, Agent, or Firm*—Frommer Lawrence & Haug LLP; William S. Frommer; Matthew K. Ryan

(57) ABSTRACT

A magnetic record/playback apparatus for continuously recording at least two tracks of data conforming to a digital recording format applied to a first magnetic tape having a first tape width onto one track formed on a second magnetic tape having a second tape width larger than the first tape width, and for reproducing the data from the second magnetic tape. This apparatus includes a fixed drum and a rotating drum adapted to be rotated relative to the fixed drum. The rotating drum has a record/playback head for recording and/or reproducing the data with respect to the second magnetic tape and an erase head for erasing the data recorded on the second magnetic tape. A plurality of grooves extending in a direction of rotation of the rotating drum are formed on the outer circumference of the rotating drum, and each of the grooves has a width of 0.21 mm±0.02 mm. Further, the head width of the erase head as measured in a direction perpendicular to the direction of rotation of the rotating drum is larger than that of the record/playback head.

6 Claims, 23 Drawing Sheets

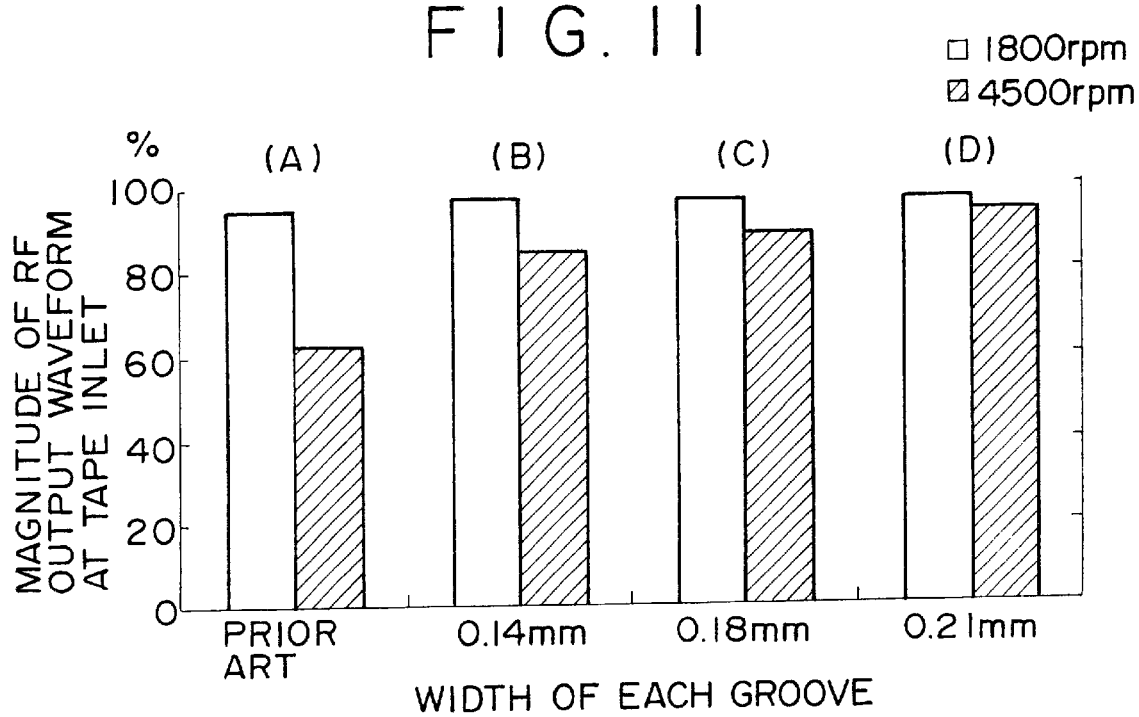
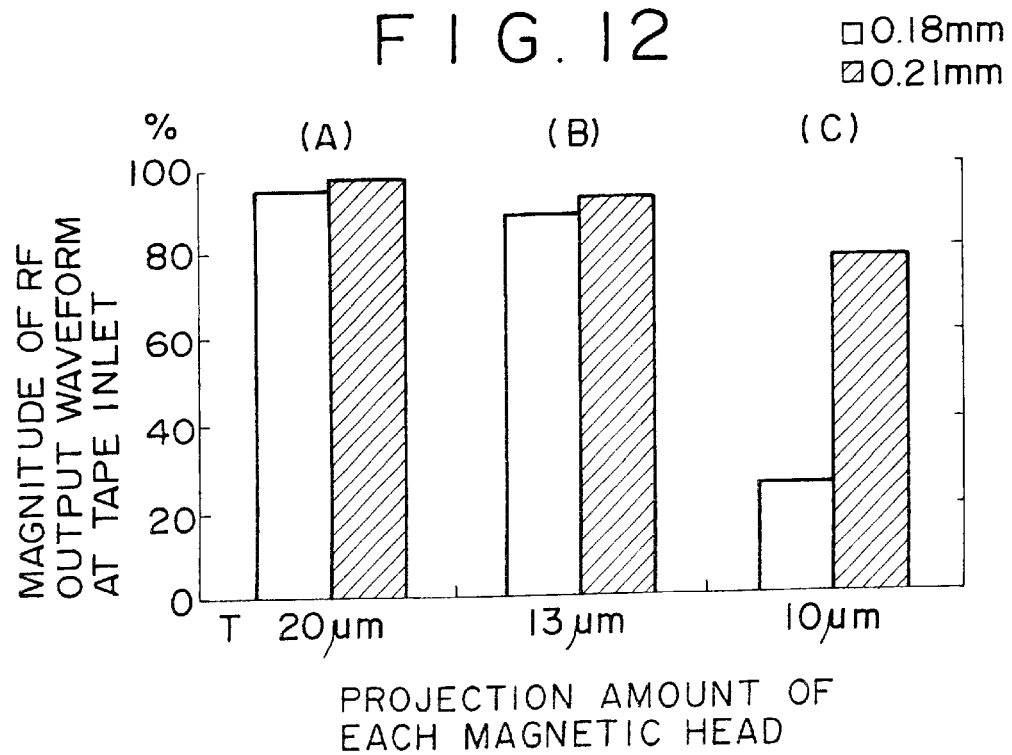

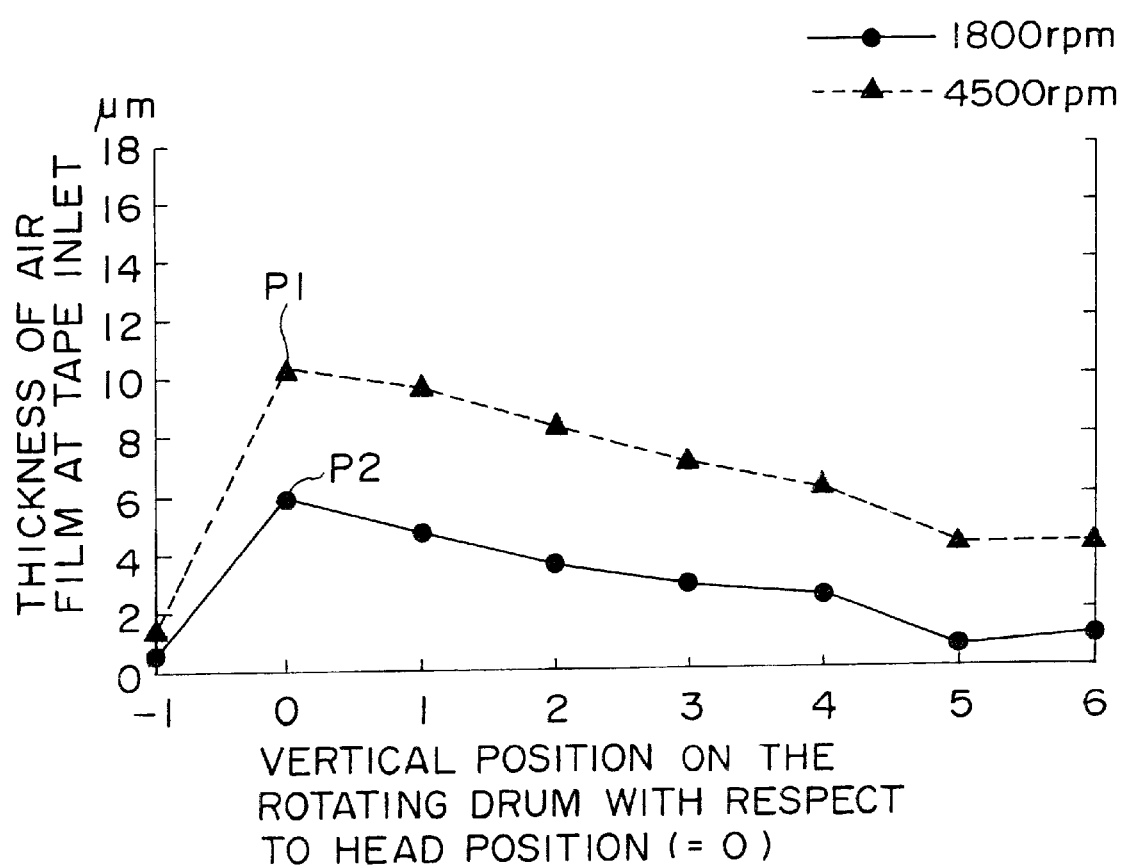

F I G. 15
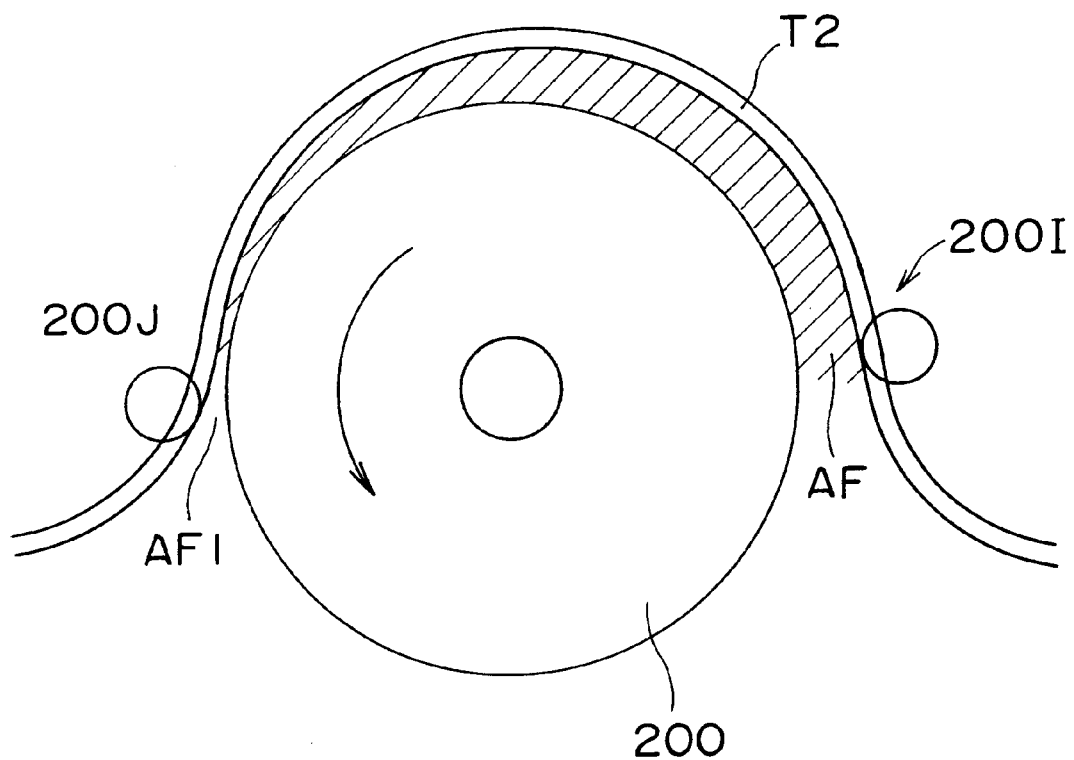

MAGNETIC RECORD/PLAYBACK APPARATUS

BACKGROUND OF THE INVENTION

The present invention relates to a magnetic record/playback apparatus for recording or reproducing a digital signal with respect to a magnetic tape.

In recent years, a combination camera/digital video tape recorder for home use and a stationary digital video tape recorder for home use for recording a digital video signal and a digital audio signal have come on the market.

As a recording system for such digital video tape recorders, a so-called DV format (IEC 61834 helical scan digital video tape cassette recording system using 6.35 mm magnetic tape for consumers (525/60, 625/50, 1125/60, and 1250/50 systems) is known. In the DV format, the tape to be used is 6.35 mm (=¼ inch), which is smaller than the tape width of a video tape to be used in a related art recording system for an analog video tape recorder (e.g., 8-mm format: IEC 60843 helical scan video tape cassette recording system using 8-mm magnetic tape for consumers). In spite of such a smaller tape width, the DV format has an advantage such that a signal to be recorded is compressed and a recording density is increased to thereby allow longer-period recording with a higher image quality as compared with the related art recording format.

There is no compatibility between the DV format and the related art recording format for the analog video tape recorder (e.g., 8-mm format). However, if a signal in the DV format can be recorded/reproduced on/from the wider video tape to be used in the related art analog recording system, the recordable/reproducible period can be further increased with a higher image quality maintained. Further, if such recording/reproduction of a DV-format signal on/from the video tape to be used in the related art recording system is allowed, existing resources including the production facilities and parts of video tape for use in the related art recording system can be effectively used.

A magnetic record/playback apparatus adapted to the format of an 8-mm analog video tape recorder, for example, includes a rotary drum unit having a rotating drum (upper drum) and a fixed drum (lower drum). The rotational speed of the rotating drum is set to 1800 rpm, for example. The outer circumferential surface of the rotating drum is formed with a groove extending in a direction of rotation of the rotating drum. In this kind of magnetic record/playback apparatus, it is important to ensure a suitable RF output waveform. It is known that in rotating the rotating drum to record/playback a signal on/from a magnetic tape by using a magnetic head, the thickness of an air film generated by rotation of the rotating drum has a large influence on whether or not a suitable RF output waveform can be obtained. In this respect, the groove is formed on the outer circumferential surface of the rotating drum to limit the thickness of the air film.

However, if the rotational speed of the rotating drum is changed to 4500 rpm, for example, to record a DV-format signal in the 8-mm format magnetic record/playback apparatus, the thickness of the air film is necessarily increased to cause a problem that a suitable RF output waveform cannot be obtained.

Further, the rotating drum has a magnetic record/playback head for recording/reproducing information on/from an analog video tape and an erase head for erasing information recorded on the analog video tape. Accordingly, the magnetic record/playback head and the erase head are rotated with rotation of the rotating drum. During rotation of the rotating drum, the magnetic record/playback head and the erase head come into contact with the analog video tape to record/playback information on/from the analog video tape or erase information recorded on the analog video tape.

Particularly, in the case that the analog video tape is a coated tape or the like having a high coercive force (Hc), information can be well recorded/reproduced by using the erase head.

To record/playback or erase a DV-format signal by using the rotating drum of a related art 8-mm format magnetic record/playback apparatus, the rotational speed of the rotating drum must be changed from 1800 rpm for analog recording to 4500 rpm for digital recording.

When the rotational speed of the rotating drum is increased as mentioned above, the magnetic record/playback head and the erase head mounted on the rotating drum are also rotated at a higher speed. As a result, the frequency of contacts of the magnetic record/playback head and the erase head with the analog video tape is increased to cause an increase in wear of each head.

In particular, since the erase head precedes the magnetic record/playback head in one revolution of the rotating drum to come into contact with the analog video tape, the wear of the erase head becomes greater than that of the magnetic record/playback head. Such a difference in worn condition between the erase head and the magnetic record/playback head shortens the service life of the magnetic record/playback apparatus.

To eliminate such a difference in worn condition between the erase head and the magnetic record/playback head, it may be proposed to add a dummy head to the rotating drum. By addition of the dummy head, a contact force between the erase head and the analog video tape can be adjusted to reduce the wear of the erase head. However, the addition of the dummy head to the rotating drum causes an increase in cost.

SUMMARY OF THE INVENTION

It is accordingly an object of the present invention to provide a magnetic record/playback apparatus which can obtain a suitable RF output waveform and can stabilize tape running both in the DV format and in the analog video tape recorder format.

It is another object of the present invention to provide a magnetic record/playback apparatus which can. reduce a difference in worn condition between a magnetic record/playback head and an erase head with a simple configuration to thereby extend the service life of the magnetic record/playback apparatus.

In accordance with an aspect of the present invention, there is provided a magnetic record/playback apparatus for continuously recording at least two tracks of data conforming to a digital recording format applied to a first magnetic tape having a first tape width onto one track formed on a second magnetic tape having a second tape width larger than the first tape width, and for reproducing the data from the second magnetic tape, comprising a fixed drum; and a rotating drum adapted to be rotated relative to the fixed drum, the rotating drum having a magnetic head for recording the data onto the second magnetic tape and for reproducing the data from the second magnetic tape; the rotating drum having an outer circumferential surface formed with a plurality of grooves extending in a direction of rotation of the rotating drum, each of the grooves having a width of 0.21 mm±0.02 mm.

As mentioned above, the plural grooves each having a width of 0.21 mm±0.02 mm are formed on the outer circumferential surface of the rotating drum so as to extend in the direction of rotation of the rotating drum. Accordingly, the thickness of an air film formed between the outer circumferential surface of the rotating drum and the magnetic tape during rotation of the rotating drum can be limited to a suitable value both in the case that the rotational speed of the rotating drum is relatively low and in the case that it is relatively high. As a result, a suitable RF output waveform can be ensured and stable running of the magnetic tape can also be ensured.

If the width of each groove is less than 0.19 mm, the thickness of the air film cannot be limited to a suitable value in recording data conforming to the digital recording format, so that it is difficult to ensure a suitable RF output waveform and stable running of the tape cannot be ensured. Further, the use environment is limited (especially at high temperatures), and the service life is reduced (due to a difference in worn condition between the heads).

If the width of each groove is greater than 0.23 mm, a suitable thickness of the air film cannot be ensured in the case of analog recording at a relatively low drum rotating speed, so that the magnetic tape tends to stick to the rotating drum. As a result, a suitable RF output waveform cannot be ensured and stable running of the magnetic tape cannot be achieved. Moreover, such a small thickness of the air film causes a degradation in wow and flutter, and an increase in contact pressure between the magnetic head and the magnetic tape causes flaw (scan flaw) on the tape surface.

Preferably, the magnetic head projects from the outer circumferential surface of the rotating drum by an amount of 20 $\mu$m±3 $\mu$m.

By setting the projection amount of the magnetic head within the above range, not only a suitable RF output waveform can be ensured, but also an impact error can be prevented and the service life of the magnetic head can be extended.

If the projection amount of the magnetic head is less than 17 $\mu$m, a suitable RF output waveform cannot be easily ensured, whereas if the projection amount of the magnetic head is greater than 23 $\mu$m, a suitable RF output waveform can be ensured, but an impact error may occur and the service life of the magnetic head may be reduced.

Preferably, the first tape width is 6.35 mm; the second tape width is 8 mm; the rotating drum is rotated at 4500 rpm in the case of recording the data conforming to the digital recording format onto the second magnetic tape; and the rotating drum is rotated at 1800 rpm in the case of recording analog data on the second magnetic tape by using the magnetic head.

In the case of digital recording on the second magnetic tape, the rotational speed of the rotating drum is set to 4500 rpm, whereas in the case of analog recording on the second magnetic tape, the rotational speed of the rotating drum is set to 1800 rpm.

Although the rotational speed of the rotating drum is changed between 4500 rpm and 1800 rpm, a suitable thickness of the air film can be obtained by setting the width of each groove of the rotating drum and the projection amount of the magnetic head within the respective given ranges mentioned above, thereby ensuring a suitable RF output waveform and stable running of the magnetic tape.

More preferably, the number of the grooves is three.

In accordance with another aspect of the present invention, there is provided a magnetic record/playback apparatus comprising a fixed drum; and a rotating drum adapted to be rotated relative to the fixed drum, the rotating drum having a magnetic record/playback head for recording and/or reproducing information in the form of digital signals with respect to a magnetic recording medium, and an erase head for erasing information recorded on the magnetic recording medium; the erase head having a head width measured in a direction perpendicular to a direction of rotation of the rotating drum, the head width of the erase head being larger than that of the magnetic record/playback head.

As mentioned above, the head width of the erase head as measured in a direction perpendicular to the direction of rotation of the rotating drum is larger than that of the magnetic record/playback head. Accordingly, although the erase head precedes the magnetic record/playback head in one revolution of the rotating drum to come into contact with the magnetic recording medium, the difference in worn condition between the erase head and the magnetic record/playback head can be reduced.

Other objects and features of the invention will be more fully understood from the following detailed description and appended claims when taken with the accompanying drawings.

BRIEF DESCRIPTION OF THE DRAWINGS

FIG. 11 is a graph showing the relation between the width of each groove formed on the rotating drum and the magnitude of an RF output waveform;

FIG. 12 is a graph showing the relation between the projection amount of each magnetic head and the magnitude of an RF output waveform;

FIG. 13 is a graph showing the thickness of an air film formed between the rotating drum and the magnetic tape in the preferred embodiment of the present invention;

FIG. 15 is a schematic plan view for illustrating a difference in thickness between an air film at a tape inlet of the rotating drum and an air film at a tape outlet of the rotating drum;

DETAILED DESCRIPTION OF THE PREFERRED EMBODIMENTS

Some preferred embodiments of the present invention will now be described in detail with reference to the attached drawings.

While the following preferred embodiments are specific preferred embodiments of the present invention including various preferred limitations, it should be noted that the present invention is not limited to these preferred embodiments unless otherwise specified in the following description.

There will first be described a recording system for recording data such as video data and audio data on a magnetic tape as a tapelike data recording medium in a preferred embodiment of the present invention. This recording system is a system for recording a so-called DV-format digital signal on a magnetic tape having a tape width of 8 mm, and this system will be hereinafter referred to as a digital 8-mm format. The recording system according to the present invention will be described in comparison with the DV format (IEC 61834) and the 8-mm format (IEC 60843) both well known in the related art.

Figure 1:
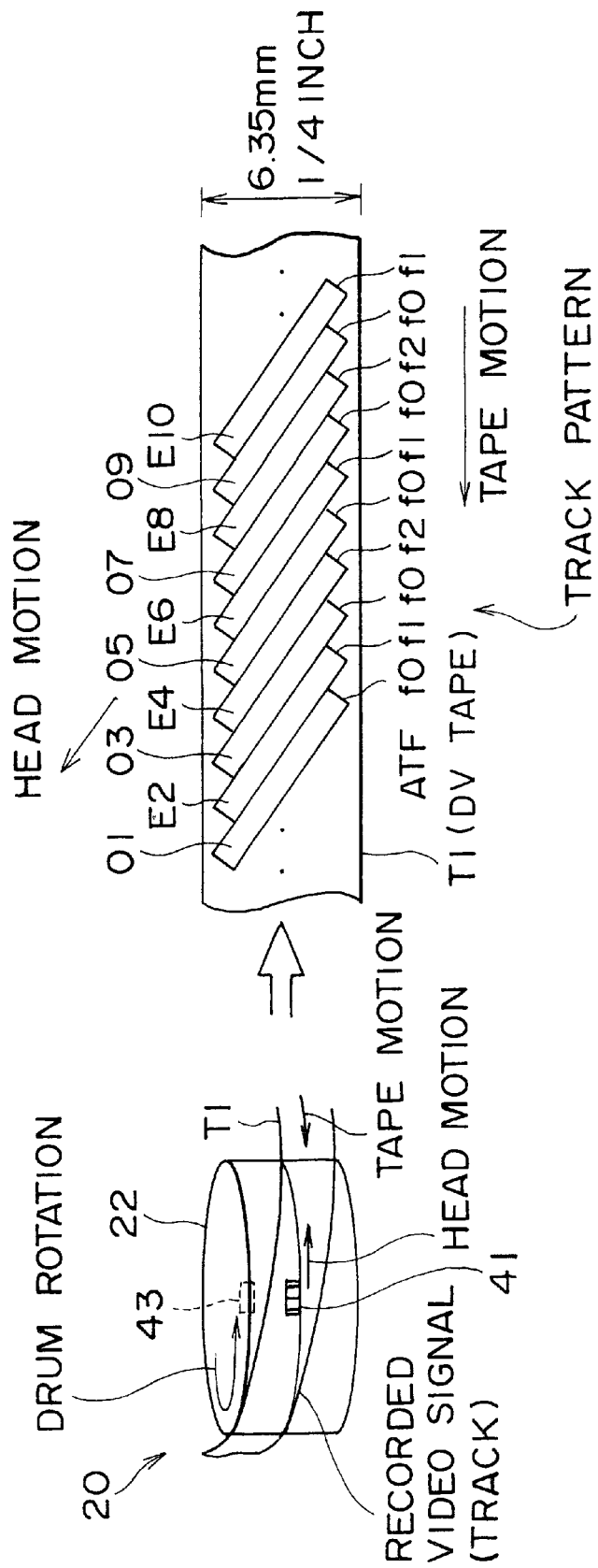
FIG. 1 is a schematic diagram showing a track pattern in the case of recording a DV-format digital signal on a magnetic tape having a tape width of 6.35 mm for use in the DV format.

FIG. 1 shows a track pattern in the case of recording a DV-format digital signal on a magnetic tape T1 having a tape width of 6.35 mm for use in the DV format (this magnetic tape T1 will be hereinafter referred to as a DV tape (corresponding to the first magnetic tape having the first tape width in the present invention)).

As shown in FIG. 1, reference numeral 20 generally denotes a rotary drum unit having a rotating drum 22 adapted to be rotated to record a video signal or the like on the DV tape T1 having a tape width of 6.35 mm (=¼ inch) in the DV format. The rotating drum 22 is provided with two magnetic heads 41 and 43 having different azimuth angles at opposite positions circumferentially spaced 180° apart from each other. Accordingly, the two magnetic heads 41 and 43 scan the DV tape T1 in a direction inclined by a given angle with respect to a feeding direction of the DV tape T1 to thereby form a track pattern as shown in FIG. 1. In the track pattern shown in FIG. 1, the tracks recorded by one of the magnetic heads 41 and 43 will now be referred to as odd tracks O1, O3, O5, O7, and O9, whereas the tracks recorded by the other magnetic head will now be referred to as even tracks E2, E4, E6, E8, and E10. In this case, one frame of video signal conforming to the NTSC (National Television System Committee) format is recorded on the totally ten tracks, or the sum of the five odd tracks O1 to O9 and the five even tracks E2 to E10 in the DV format. Further, in the PAL (Phase Alternation by Line) format, one frame of video signal is recorded on totally twelve tracks.

Figure 2:
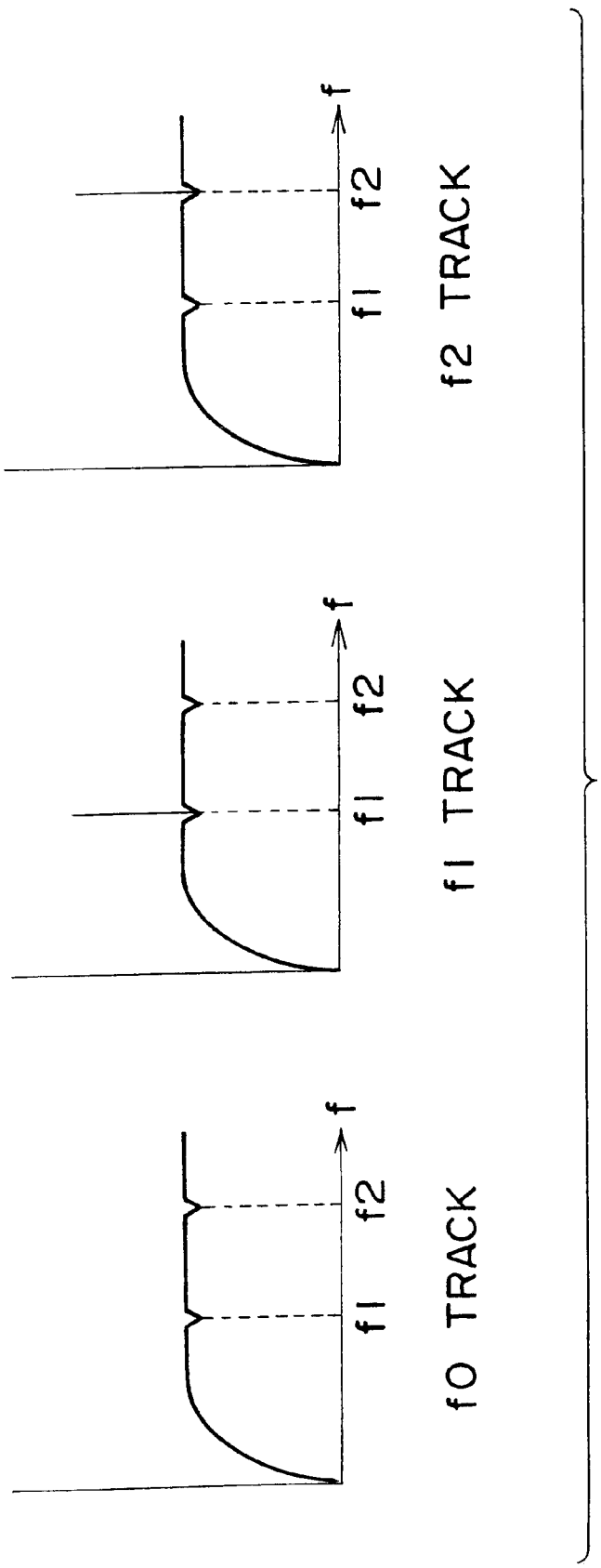
FIG. 2 is a representation of spectra of pilot signals superimposed onto all tracks shown in FIG. 1.

Further, in the DV format, the whole data to be recorded on each track is subjected to 24/25 conversion, thereby superimposing pilot signals for ATF (Automatic Track Finding (or Following)) on all the tracks. In reproduction, any of these pilot signals is detected to thereby effect tracking of each magnetic head. The 24/25 conversion is performed by inserting an extra bit (1 bit) into data of every 24 bits (3 bytes) to thereby superimpose low-frequency pilot components having three frequencies on the sequence of data to be recorded. More specifically, the run-length of data to be recorded is set to 9 or less, and pilot signals having frequencies f0, f1, and f2 as satisfying the spectrum shown in FIG. 2 are superimposed on all the tracks. For example, in this DV format, the pilot signal having the frequency f0 is superimposed on each of the odd tracks O1, O3, O5, O7, and O9, and the pilot signals having the frequencies f1 and f2 are alternately superimposed on the even tracks E2, E4, E6, E8, and E10. Accordingly, the pilot signals having the frequencies f0, f1, and f2 are recorded on all the tracks in such a manner that the frequencies f0, f1 and f2 are cyclically arranged as in the sequence of . . . , f0, f1, f0, f2, f0, f1, f0, f2, . . . . Recording such pilot signals provides an advantage such that when one of the magnetic heads scans the track on which the pilot signal of the frequency f0 has been recorded, the pilot components of the frequencies f1 and f2 recorded on the adjacent tracks can be obtained as crosstalk signals, thereby effecting stable tracking in reproduction.

Figure 3:
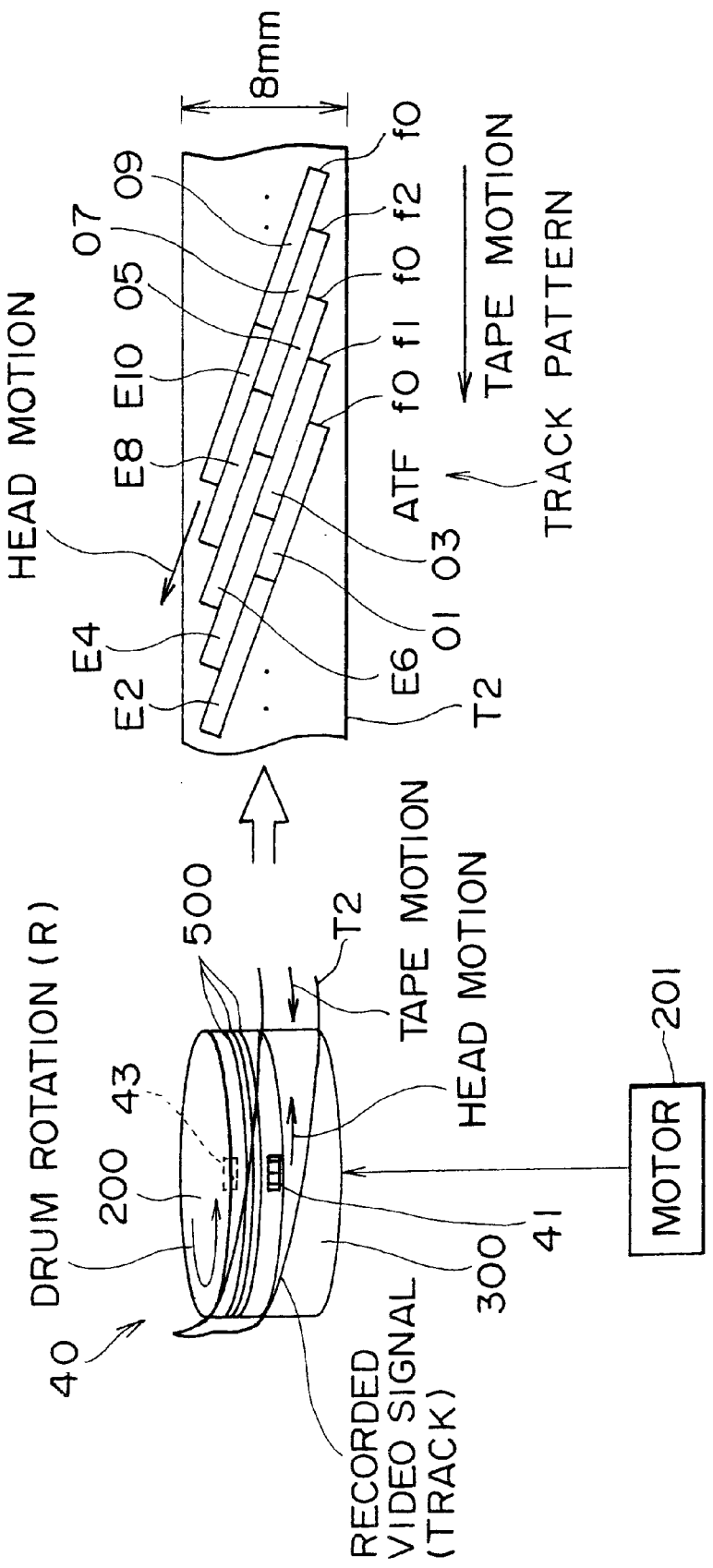
FIG. 3 is a schematic diagram showing a track pattern in the case of recording a digital signal in the recording format according to the present invention on a magnetic tape having a tape width of 8 mm.

FIG. 3 shows a track pattern in the case of recording a digital signal of the digital 8-mm format according to the present invention on a magnetic tape T2 having a tape width of 8 mm (this magnetic tape T2 will be hereinafter referred to as a 8-mm tape (corresponding to the second magnetic tape having the second tape width in the present invention)).

In the digital 8-mm format, a digital video signal or the like is rotated to be recorded on the 8-mm tape T2 (which will also be referred simply as a magnetic tape) wider than the DV tape T1 shown in FIG. 1. This 8-mm tape T2 is the same as a magnetic tape used in the related art 8-mm format (IEC 60843) for recording an analog video signal. As shown in FIG. 3, reference numeral 40 denotes a rotary drum unit having a rotating drum 200 adapted to be rotated by a motor 201 to record a digital video signal or the like on the 8-mm tape T2. The rotating drum 200 is provided with two magnetic heads 41 and 43 having different azimuth angles at opposite positions circumferentially spaced 180° apart from each other as in the related art analog 8-mm format. Accordingly, the two magnetic heads 41 and 43 scan the 8-mm tape T2 in a direction inclined by a given angle with respect to a feeding direction of the 8-mm tape T2 to thereby form a track pattern as shown in FIG. 3.

In this digital 8-mm format, data on two tracks in the DV format are sequentially recorded on one track of the 8-mm tape T2 with the data pattern of the DV format being maintained. In other words, data on any odd track and data on its adjacent even track in the DV format are combined as one set and recorded on one track without changing the content of the data in the digital 8-mm format.

More specifically, in the 8-mm tape T2 of the digital 8-mm format shown in FIG. 3, data on the odd track O1 and data on the even track E2 in the DV format are combined as one set to be recorded on one track. Similarly, data on the odd track O3 and data on the even track E4 in the DV format are combined as one set to be recorded on the second track. Similarly, data on the odd track O5 and data on the even track E6 in the DV format are combined as one set to be recorded on the third track. Similarly, data on the odd track O7 and data on the even track E8 in the DV format are combined as one set to be recorded on the fourth track. Similarly, data on the odd track O9 and data on the even track E10 in the DV format are combined as one set to be recorded on the fifth track. In this manner, data on any two adjacent tracks in the DV format are combined as one set to be recorded on each track of the 8-mm tape T2.

Accordingly, one frame of video signal conforming to the NTSC format is recorded on five tracks of the 8-mm tape T2 in the digital 8-mm format. Meanwhile, one frame of video signal conforming to the PAL format is recorded on six tracks of the 8-mm tape.

In this digital 8-mm format, extended data is also recorded on each track of the 8-mm tape T2 in addition to data on two tracks in the DV format.

As mentioned above, pilot signals having three frequencies f0, f1, and f2 for ATF are superimposed on the data recorded on all the tracks by performing 24/25 conversion in this digital 8-mm format. That is, pilot signals having different frequencies are recorded on any adjacent tracks in the digital 8-mm format, each track corresponding to two tracks in the DV format. More specifically, in the digital 8-mm format, the pilot signals having the frequencies f0, f1, and f2 are recorded on all the tracks each configured by a set of combined odd track and even track in the DV format in such a manner that the frequencies f0, f1, and f2 are cyclically arranged as in the sequence of . . . , f0, f1, f0, f2, f0, f1, f0, f2, . . . . Recording such pilot signals provides an advantage such that when one of the magnetic heads scans the track on which the pilot signal of the frequency f0 has been recorded, the pilot components of the frequencies f1 and f2 recorded on the adjacent tracks can be obtained as crosstalk signals, thereby effecting stable tracking in reproduction. These pilot signals are also superimposed on the extended data recorded on all the tracks. The frequency of the pilot signal superimposed on the extended data on one track in the digital 8-mm format is the same as that of data recorded on this track corresponding to two tracks in the DV format.

Figure 4A:
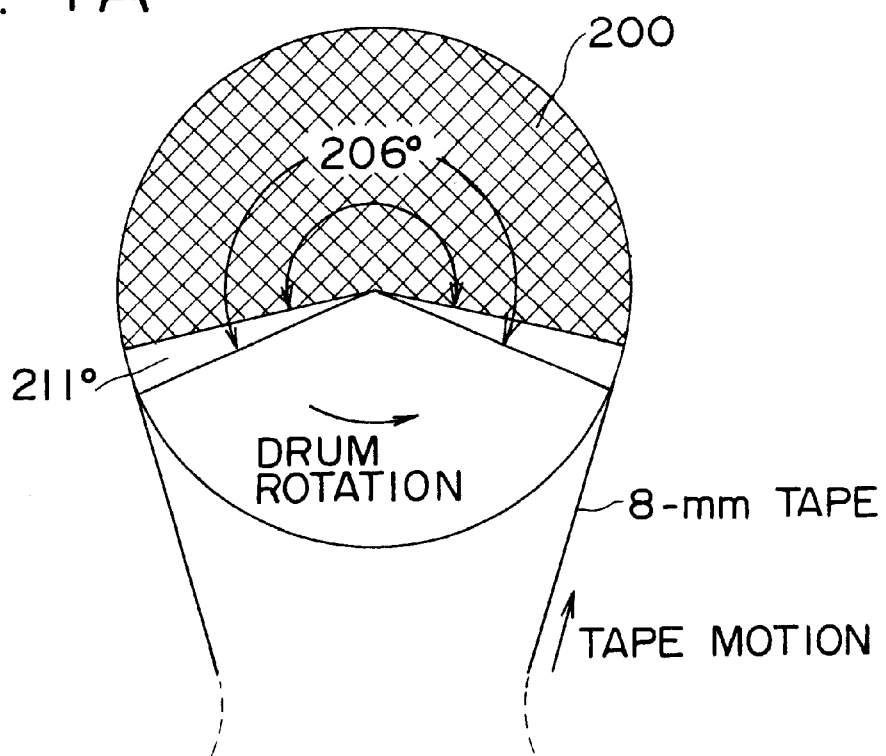
FIG. 4A is a plan view for illustrating a tape wrap angle of the magnetic tape around a rotating drum in the recording format according to the present invention.

FIG. 4A shows a tape wrap angle of the 8-mm tape T2 around the rotating drum 200 in the digital 8-mm format.

As shown in FIG. 4A, the 8-mm tape T2 is wrapped around the rotating drum 200 in an angular range of 206° in the digital 8-mm format. One track on the 8-mm tape T2 is configured by a signal recorded during scanning of one of the magnetic heads in this wrap angle 206°. Alternatively, the wrap angle of the 8-mm tape T2 may be set to 211° which is the same as that in the related art analog 8-mm format. In this case, a signal is recorded in a partial angular range of 206° of this wrap angle 211°.

Figure 5:
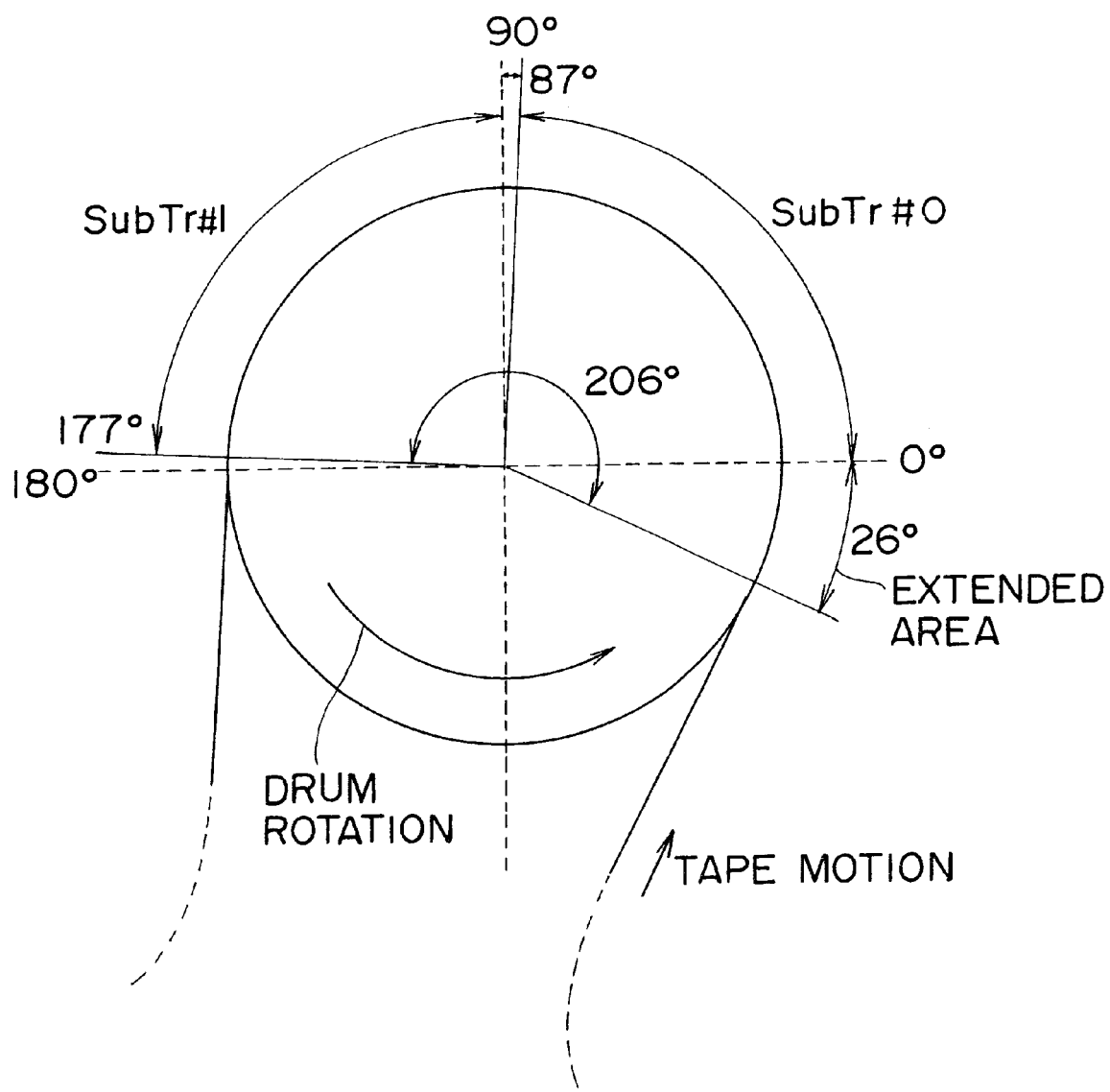
FIG. 5 is a plan view for illustrating an effective wrap angle in one track in the recording format according to the present invention.
Figure 6:
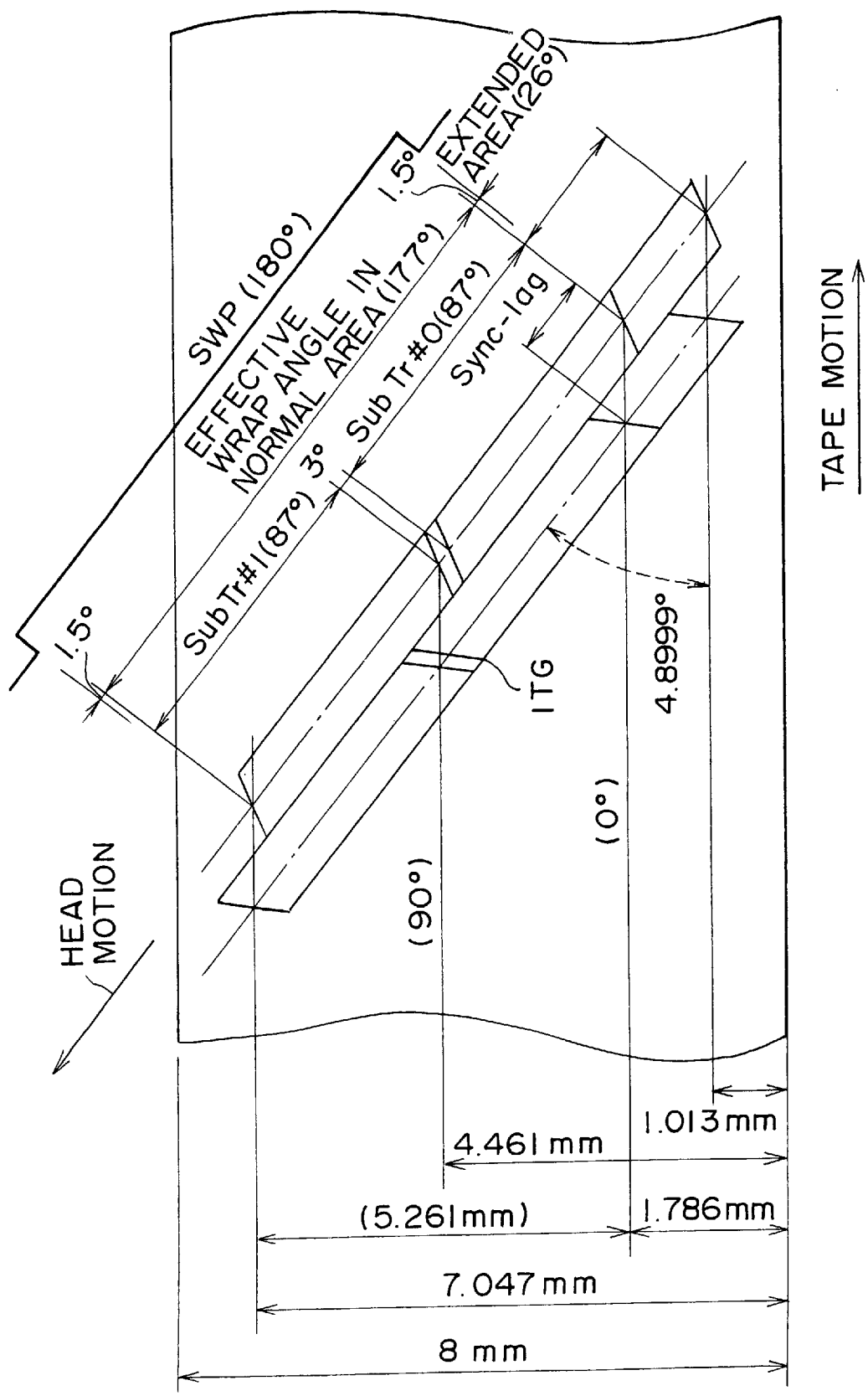
FIG. 6 is a schematic diagram for illustrating an example of the track pattern on the magnetic tape in the recording format according to the present invention.

FIG. 5 shows an example of an effective wrap angle in one track in the digital 8-mm format, and FIG. 6 shows a track pattern on the 8-mm tape T2 in the digital 8-mm format.

In the digital 8-mm format, the effective wrap angle is set to 177°, for example, as shown in FIGS. 5 and 6. In the range of this effective wrap angle, two subtracks (SubTr #0 and SubTr #1) are provided. The wrap angle of each subtrack is set to 87°, and data on one track in the DV format is recorded on each subtrack without changing the DV data format. Accordingly, data on one odd track and data on its adjacent even track in the DV format are continuously recorded in this effective wrap angle. Further, there is defined a 3° gap as ITG (Inter-Track Gap) between the two subtracks (SubTr #0 and SubTr #1) in this effective wrap angle.

In the digital 8-mm format, an extended area is provided on the front side of the effective wrap angle, that is, at the leading end of one track with respect to a moving head position. The wrap angle of the extended area is set to 26°. Accordingly, the total wrap angle of one track is equal to 206° as the sum of the wrap angle 26° of the extended area and the effective wrap angle 177°.

In the digital 8-mm format, the two magnetic heads 41 and 43 provided on the rotating drum 200 are switched by a switching pulse SWP generated in synchronism with a rotational phase of the rotating drum 200. At the time the recording of data in the effective wrap angle by one of the magnetic heads 41 and 43 (e.g., Ach) is ended, the switching pulse SWP is turned on or off to start the recording of data in the effective wrap angle by the other magnetic head (e.g., Bch). The switching pulse SWP is turned on or off every time the rotating drum 200 is rotated 180°.

The recording of data in the extended area is started prior to switching of the switching pulse SWP in synchronization by an extension track sync information (Ex-ITI) or a track sync information (ITI) of the previous track to be hereinafter described.

In the recording system for a magnetic tape according to the present invention as described above, data on two tracks in the DV format are continuously recorded on one track of the 8-mm tape T2 without changing the data pattern. Accordingly, the area of the tape can be effectively used to allow longer-period recording. In other words, in recording the same quantity of data (for the same period of time), a required tape length of the 8-mm tape T2 can be made shorter than that of the DV tape T1, thus improving tape consumption.

The above-mentioned recording system as shown in FIG. 3 is merely illustrative, and data on three or more tracks in the DV format may be continuously recorded on one track according to the present invention, thereby allowing a further increase in recording period of time. In other words, when recording the same quantity of data, a required tape length can be further reduced.

In configuring a magnetic record/playback apparatus using the recording system according to the present invention, it is only necessary to change the drum rotating speed from 1800 rpm for analog recording on a 8-mm tape into 4500 rpm, and a mechanical deck portion of a related art analog 8-mm video tape recorder can be used without any changes to form the above-mentioned track pattern on the 8-mm tape T2.

A capstan speed (i.e., tape feed speed) merely determines a track pitch, and a required track pitch may therefore be determined according to the characteristics of the tape and the head or according to the presence or absence of compatibility as required.

The data format of data to be recorded in the range of the effective wrap angle and the data format of data to be recorded in the extended area will now be described. The range of the effective wrap angle will be hereinafter referred to as a normal area in contrast to the extended area.

By providing the extended area, after-recording of audio data and image data can be performed without overwriting them on the data recorded in the normal area in the digital 8-mm format. In particular, by providing a sufficient gap and track sync information for data in the extended area, reliable after-recording can be performed.

There will now be described a magnetic record/playback apparatus for recording video data and audio data by using the above-mentioned digital 8-mm format.

Figure 7:
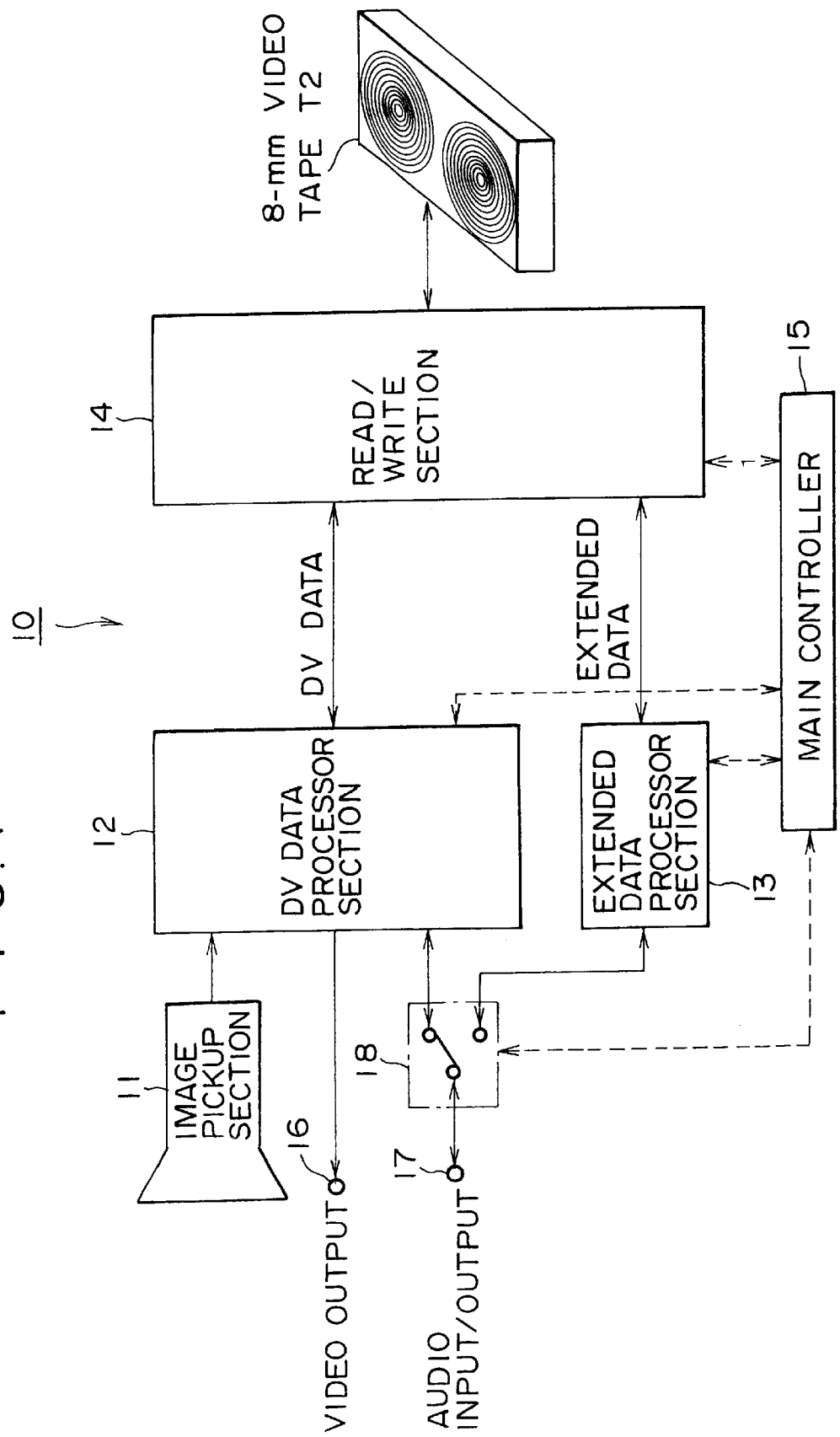
FIG. 7 is a block diagram showing a schematic configuration of a magnetic record/playback apparatus according to a preferred embodiment of the present invention.

FIG. 7 shows a schematic configuration of a magnetic record/playback apparatus 10 according to a preferred embodiment of the present invention.

The magnetic record/playback apparatus 10 is a so-called combination camera/video tape recorder for recording video data and audio data in the above-mentioned digital 8-mm format on the 8-mm tape T2 shown in FIG. 3 and reproducing the video data and audio data from the 8-mm tape T2.

As shown in FIG. 7, the magnetic record/playback apparatus 10 includes an image pickup section 11 for picking up an object image to output an analog video signal, a DV data processor section 12 for converting the analog video signal generated in the image pickup section 11 into DV data and for converting DV data read from the 8-mm tape T2 into an analog video signal, an extended data processor section 13 for generating extended data to be recorded in the extended area of the 8-mm tape T2 and for processing extended data read from the extended area of the 8-mm tape T2, a read/write section 14 for reading and writing data with respect to the 8-mm tape T2, and a main controller 15 for controlling each component.

The magnetic record/playback apparatus 10 further includes a video output terminal 16 for outputting the analog video signal generated in the DV data processor section 12, an audio input/output terminal 17 for inputting and outputting an audio signal, and a switch 18 for selectively supplying an audio signal input from the audio input/output terminal 17 to the DV data processor section 12 or the extended data processor section 13 and for selectively supplying an audio signal output from the DV data processor section 12 or the extended data processor section 13 to the audio input/output terminal 17.

The image pickup section 11 shown in FIG. 7 is composed of an optical system such as lenses, a CCD, and an electrical system such as a signal processing circuit, for example. The image pickup section 11 generates an analog video signal (inclusive of a luminance signal, red color difference signal, and blue color difference signal) and supplies this analog video signal to the DV data processor section 12.

In recording, the DV data processor section 12 receives an analog video signal from the image pickup section 11, an analog audio signal supplied from an external source via the audio input/output terminal 17, and additional information from the main controller 15. Then, the DV data processor section 12 converts these signals and information into a data format conforming to the DV format, and supplies the converted data per track in the DV format (corresponding to the data to be written on each subtrack (SubTr #0 or SubTr #1) in the digital 8-mm format) to the read/write section 14.

In reproduction, the DV data processor section 12 receives DV data read from the normal area (the effective wrap angle) of the 8-mm tape T2 by the read/write section 14, and divides this DV data into video data, audio data, and additional information. Then, the DV data processor section 12 converts the video data into an analog video signal, and supplies the analog video signal to the video output terminal 16 for output. Further, the DV data processor section 12 converts the divided audio data into an analog audio signal, and supplies the divided analog audio signal to the audio input/output terminal 17 for output. Further, the DV data processor section 12 supplies the divided additional information to the main controller 15.

In recording or after-recording of voice, the extended data processor section 13 receives an audio signal from the audio input/output terminal 17 supplied from an external source and additional information from the main controller 15. Then, the extended data processor section 13 converts these signal and information into a data format suitable for recording in the extended area, and supplies the converted data as extended data to be recorded in the extended area, to the read/write section 14. In reproduction, the extended data processor section 13 receives extended data read from the extended area of the 8-mm tape T2 by the read/write section 14, and divides the extended data into audio data and additional information. Then, the extended data processor section 13 converts the divided audio data into an analog audio signal, and supplies the analog audio signal to the audio input/output terminal 17. Further, the extended data processor section 13 supplies the additional information to the main controller 15.

Additionally, the extended data processor section 13 performs 24/25 conversion of the extended data to be recorded to record a pilot signal in the extended area.

The pilot signal has the same frequency as that of a pilot signal superimposed on the DV data recorded on the normal area of the same track.

In the case of recording audio data in an audio region of the normal area in recording on the tape, the switch 18 shown in FIG. 7 selects a first terminal connected to the DV data processor section 12 to supply an audio signal to the DV data processor section 12. In the case of recording audio data in an extended data region of the extended area in recording or after-recording on the tape, the switch 18 selects a second terminal connected to the extended data processor section 13 to supply an audio signal to the extended data processor section 13. In the case of outputting audio data recorded in the normal area in reproducing from the tape, the switch 18 selects the first terminal to supply an audio signal from the DV data processor section 12 to the audio input/output terminal 17. In the case of outputting audio data recorded in the extended area in reproducing from the tape, the switch 18 selects the second terminal to supply an audio signal from the extended data processor section 13 to the audio input/output terminal 17.

The read/write section 14 performs switching control of the magnetic heads, circuit control of the rotating drum, moving speed control of the 8-mm tape T2, etc. to read/write DV data and extended data with respect to the normal area and the extended area.

The main controller 15 shown in FIG. 7 performs control of the DV data processor section 12, control of the extended data processor section 13, control of the read/write section 14, generation of additional information to be supplied to the DV data processor section 12 and the extended data processor section 13, and processing of additional information read from the 8-mm tape T2. The main controller 15 also performs switching control of the switch 18.

Figure 8:
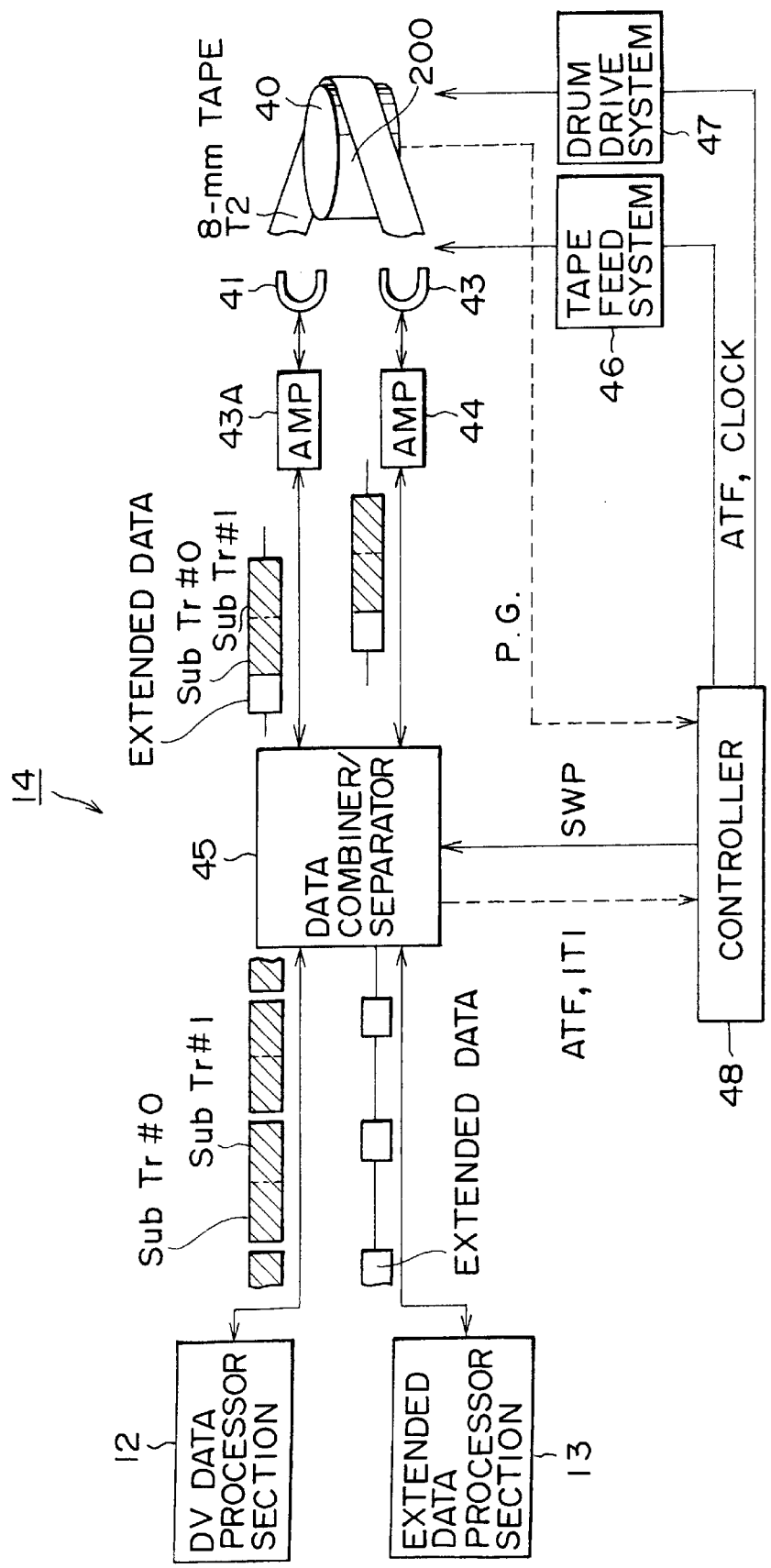
FIG. 8 is a block diagram showing a schematic configuration of a read/write section in the magnetic record/playback apparatus shown in FIG. 7.

FIG. 8 shows a preferred embodiment of the read/write section 14 shown in FIG. 7.

The read/write section 14 includes a rotary drum unit 40 having a rotating drum 200, first and second magnetic heads 41 and 43 provided on the rotating drum 200, a first amplifier 43A for driving the first magnetic head 41, a second amplifier 44 for driving the second magnetic head 43, a data combiner/separator 45 for combining and separating DV data and extended data to be recorded, a tape feed system 46 for feeding the 8-mm tape T2, a drum drive system 47 for driving the rotary drum unit 40, and a controller 48.

The 8-mm tape T2 is wrapped around the rotary drum unit 40 in a helical-scan format. The first and second magnetic heads 41 and 43 are provided on the outer circumferential surface of the rotating drum 200 of the rotary drum unit 40 at opposite position circumferentially spaced 180° apart from each other.

Each of the first and second magnetic heads 41 and 43 is moved by rotation of the rotating drum 200 of the rotary drum unit 40 to slide on the 8-mm tape T2 in a direction inclined by 4.8999° with respect to the longitudinal direction (feeding direction) of the 8-mm tape T2, thereby recording or reproducing signals on or from the 8-mm tape T2. The first and second magnetic heads 41 and 43 are switched according to a rotational position of the rotating drum 200 to perform recording or reproduction of signals. This switching is performed in synchronism with a switching pulse SWP generated from the controller 48.

The switching pulse SWP is switched between a high level and a low level every time the rotating drum 200 is rotated 180° according to a PG signal indicative of a rotational phase of the rotating drum 200. For example, while the switching pulse SWP is of a high level, the first magnetic head 41 is selected to record or reproduce signals, and while the switching pulse SWP is of a low level, the second magnetic head 43 is selected to record or reproduce signals.

The tape feed system 46 feeds the 8-mm tape T2 at a constant speed during normal recording and reproduction.

The drum drive system 47 rotates the rotating drum 200 of the rotary drum unit 40 at a constant speed (e.g., 4500 rpm) during normal recording and reproduction.

In reproduction, the controller 48 shown in FIG. 8 controls a rotational phase of the rotating drum 200 of the rotary drum unit 40 to perform tracking control of the first and second magnetic heads 41 and 43. The rotational phase control of the rotating drum 200 is performed according to an ATF pilot signal detected by the data combiner/separator 45. The ATF pilot signal is superimposed on data recorded on each track. When the first magnetic head 41 (or the second magnetic head 43) scans the track on which a pilot signal having a frequency f0 has been recorded, the controller 48 detects pilot components having frequencies f1 and f2 recorded on the adjacent tracks as crosstalk signals to thereby perform tracking control so that the pilot signals from the adjacent tracks become equal.

In reproduction or overwriting, the controller 48 detects ITI or Ex-ITI to control a recording position or reproducing position of the magnetic head on the track. For example, in the case of rewriting of only audio data, rewriting of only video data, rewriting of only subcode, or rewriting of only extended data, the controller 48 performs such control that when the magnetic head comes to a given position on one track, overwriting of data is started and no new data is written on the data recorded on the other portion of the track. More specifically, in the case of rewriting audio data or video data recorded in a normal area, the controller 48 detects the ITI recorded at the leading end of the track in this normal area to generate a clock, thereby performing write control of the rotary drum unit 40, the first magnetic head 41, and the second magnetic head 43. In the case of rewriting extended data or subcode in an extended area, the controller 48 detects the Ex-ITI recorded at the leading end of this extended area to generate a clock, thereby performing write control of the rotary drum unit 40, the first magnetic head 41, and the second magnetic head 43.

In recording, the data combiner/separator 45 receives DV data from the DV data processor section 12 and extended data from the extended data processor section 13. Then, the data combiner/separator 45 separates the DV data into a plurality of segments each corresponding to two tracks in the DV format, and combines each segment with the extended data corresponding to one track, thus forming data corresponding to one track in the digital 8-mm format. Then, the data combiner/separator 45 cyclically selects one of the magnetic heads 41 and 43 to be used for recording according to the switching pulse SWP, and supplies the one-track data to the selected magnetic head 41 or 43.

In reproduction, the data combiner/separator 45 receives data read from the 8-mm tape T2 by the first and second magnetic heads 41 and 43. Then, the data combiner/separator 45 separates the data corresponding to one track supplied from each of the magnetic heads 41 and 43 into DV data corresponding to two tracks in the DV format as read from the normal area and extended data as read from the extended area. Then, the data combiner/separator 45 cyclically selects one of the magnetic heads 41 and 43 to be used for reproduction according to the switching pulse SWP to supply the DV data to the DV data processor section 12 and the divided extended data to the extended data processor section 13.

There will now be described the timing of switching of the magnetic heads 41 and 43 in the magnetic record/playback apparatus 10 in recording.

Figure 9:
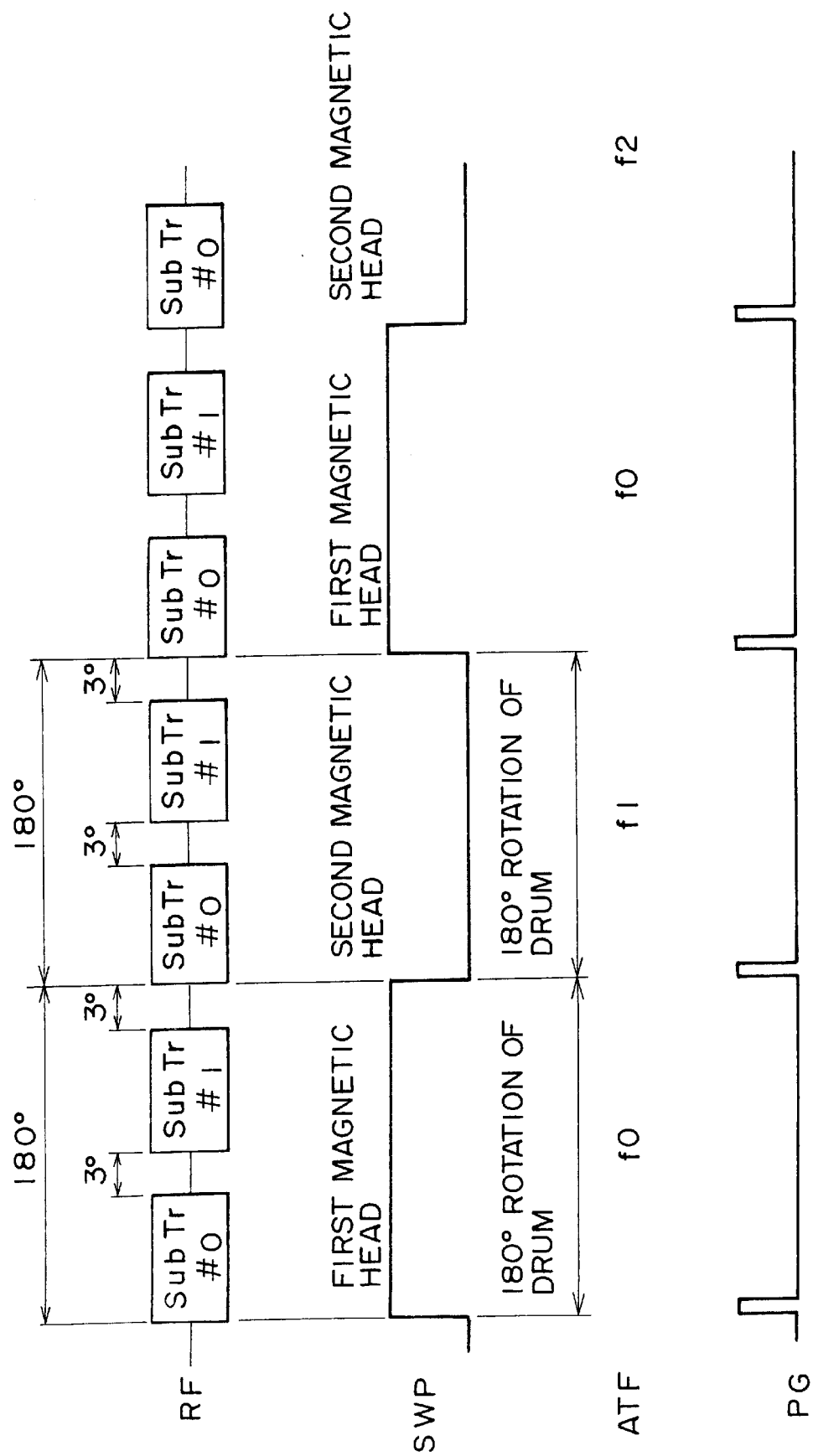
FIG. 9 is a timing chart showing an example of the switching timing of the magnetic heads and the sequence of the ATF pilot signals in the magnetic record/playback apparatus shown in FIG. 7.

FIG. 9 is a timing chart showing an example of the switching timing of the magnetic heads 41 and 43 and the sequence of the ATF pilot signals in the magnetic record/playback apparatus 10 in recording. In the magnetic record/playback apparatus 10, the diameter of the rotating drum 200 is set to 40 mm, and the rotational speed of the rotating drum 200 is set to 4500 rpm.

Figure 4B:
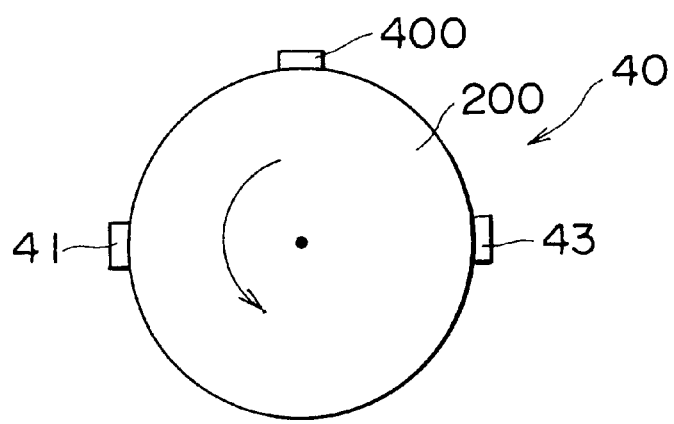
FIG. 4B is a plan view for illustrating the positions of magnetic heads mounted on the rotating drum.

In the magnetic record/playback apparatus 10, the clock frequency (recording rate per head) of an RF signal is set to 41.85 Mbps, which is the same as that in the related art DV-format record/playback apparatus. Data on an odd track (Och) in the related art DV-format record/playback apparatus is recorded on a first subtrack (SubTr #0), and data on an even track (Ech) in the related art DV-format record/playback apparatus is recorded on a second subtrack (SubTr #1) subsequent to the first subtrack (SubTr #0). A short time interval corresponding to a wrap angle of 3° is defined between the first subtrack (SubTr #0) and the second subtrack (SubTr #1). A rotational angle of 180° is defined between a data start position on the first subtrack (SubTr #0) and a data start position on the next first subtrack (SubTr #0). The two magnetic heads 41 and 43 provided on the rotating drum 200 of the rotary drum unit 40 as shown in FIG. 4B are alternately switched by a switching pulse SWP turned on and off every time the channel of a set of RF signals on the subtracks (SubTr #0 and SubTr #1) is changed.

That is, in the magnetic record/playback apparatus 10, a set of RF signals on an odd track (Och) and an even track (Ech) in the DV format is handled as one channel, which is recorded as one track, every 180° rotation of the rotating drum 200.

The ATF pilot signals in the magnetic record/playback apparatus 10 are cyclically recorded as in the sequence of . . . , f0, f1, f0, f2, f0, f1, . . . as shown in FIG. 3 on all the tracks provided with a channel composed of a set of RF signals. The above-mentioned switching of the two magnetic heads and the allocation of the different ATF pilot signals are performed to form a given track pattern.

As described above, in the magnetic record/playback apparatus 10 according to the present invention, DV-format data can be recorded on the 8-mm tape T2 wider than the magnetic tape T1 used in the DV format. Further, DV-format data on two tracks can be continuously recorded on one track in the digital 8-mm format without changing the data format, thereby allowing effective use of a tape area and accordingly allowing longer-period recording. Conversely, in recording the same quantity of data, a required tape length can be reduced as compared with that in the DV format as shown in FIG. 1, thereby allowing improvement in tape consumption.

Further, in the magnetic record/playback apparatus 10 according to the present invention, DV-format data can be recorded on the 8-mm tape T2 by simply changing the rotational speed of the rotating drum mounted in the mechanical deck portion of an existing 8-mm tape recorder and by merely rearranging the switching pulses and the ATF pilot signals in a DV signaling system, thereby allowing effective use of existing resources including the production facilities and parts of related art video tape.

While the above-mentioned magnetic record/playback apparatus (called also a magnetic recording apparatus) includes the rotary drum unit 40 as shown in FIG. 3, the rotary drum unit 40 is composed generally of a rotating drum 200 and a fixed drum 300. The rotating drum 200 is called also an upper drum, and the fixed drum 300 is called also a lower drum.

The rotating drum 200 is rotated in a direction of arrow R shown in FIG. 3 relative to the fixed drum 300 by the drum drive system 47.

Figure 10:
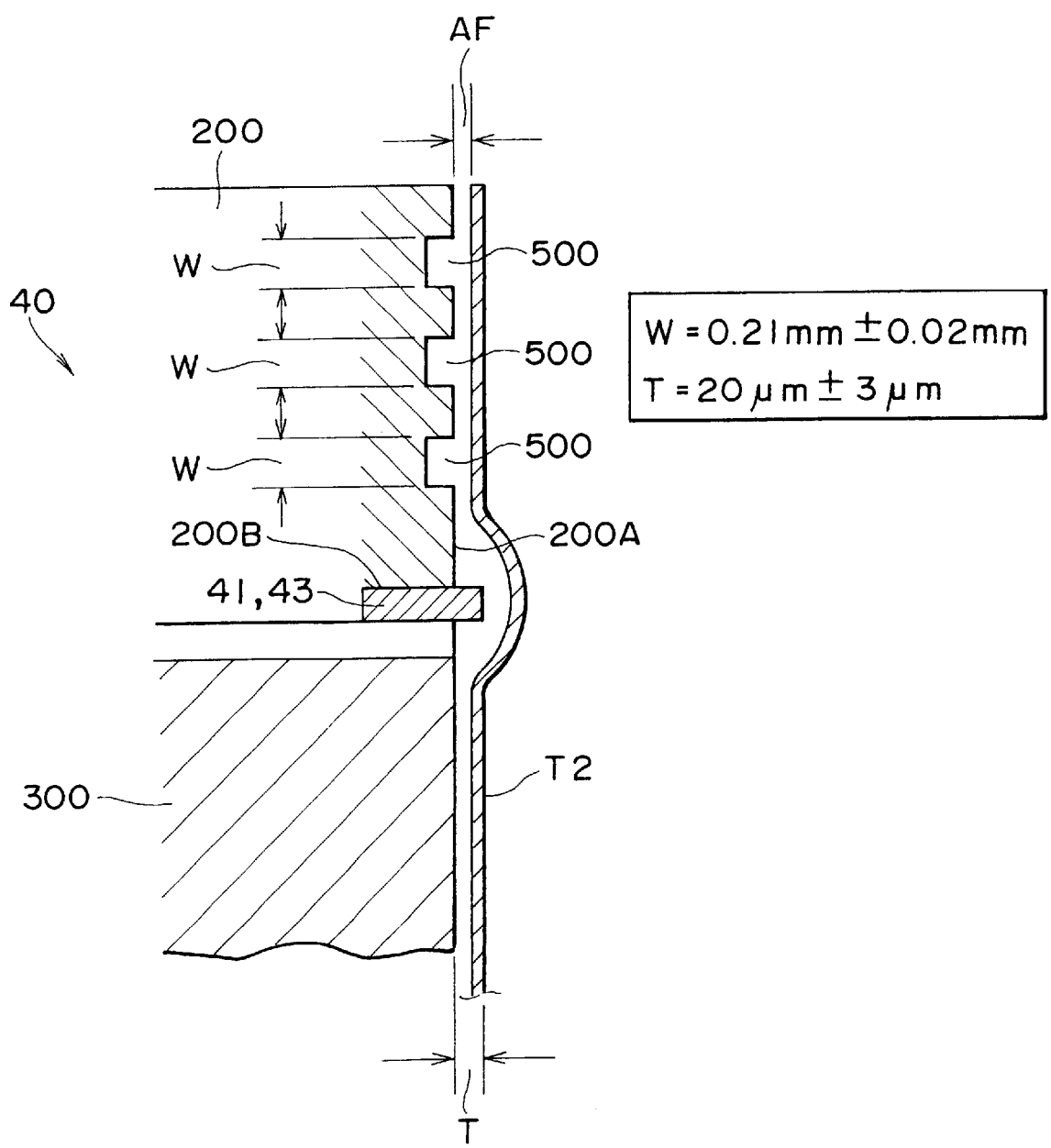
FIG. 10 is an enlarged sectional view of an essential part of a rotary drum unit in the magnetic record/playback apparatus shown in FIG. 7.

FIG. 10 is an enlarged sectional view of an essential part of the rotary drum unit 40 including the rotating drum 200, the fixed drum 300, and the magnetic heads 41 and 43 (one of which being shown). The magnetic heads 41 and 43 are mounted on the lower surface of the rotating drum 200 at opposite positions circumferentially spaced 180° apart from each other. As shown in FIG. 4B, an erasable head 400 is also mounted on the rotating drum 200 in a similar manner.

As shown in FIGS. 3 and 10, a plurality of (e.g., three as shown in this preferred embodiment) grooves 500 are formed on an outer circumferential (cylindrical) surface 200A of the rotating drum 200 so as to extend along the rotational direction of the rotating drum 200. In this preferred embodiment, all the grooves 500 have the same width W, and they are formed in parallel at equal intervals.

Each of the magnetic heads 41 and 43 is fixed in a recess 200B formed on the lower surface of the rotating drum 200 of the rotary drum unit 40 so as to project by an amount T from the outer circumferential surface 200A of the rotating drum 200. An air film AF is formed between the outer circumferential surface 200A of the rotating drum 200 and the magnetic tape T2 by the rotation of the rotating drum 200. By suitably limiting the thickness of the air film AF, a suitable RF output waveform in each of the magnetic heads 41 and 43 can be ensured, and stable running of the magnetic tape T2 can also be ensured. To this end, the width W of each groove 500 is set to fall within a given range, and the projection amount T of each of the magnetic heads 41 and 43 is set to fall within a given range as will be hereinafter described.

To ensure suitable performances of the rotary drum unit 40 shown in FIG. 3 both in the case that the magnetic heads 41 and 43 perform analog recording on the magnetic tape T2 at 1800 rpm for the rotational speed of the rotating drum 200 and in the case that the magnetic heads 41 and 43 perform digital recording on the magnetic tape T2 at 4500 rpm for the rotational speed of the rotating drum 200 as shown in FIG. 3, the given range of the width W of each groove 500 and the given range of the projection amount T of each of the magnetic heads 41 and 43 are set as follows:

Width W of each groove 500 of the rotating drum 200: 0.21 mm±0.02 mm

Projection amount T of each of the magnetic heads 41 and 43: 20 $\mu$m±3 $\mu$m If the width W of each groove 500 is less than 0.19 mm, the thickness of the air film AF cannot be limited to a suitable value in recording data in the digital recording format, so that it is difficult to ensure a suitable RF output waveform, and stable running of the magnetic tape cannot be achieved. Furthermore, the use environment is limited. That is, although there is almost no influence at ordinary temperatures, the magnetic tape lacks firmness at ambient temperatures of 30° C. or higher as in summer, causing an influence on the RF output waveform. Further, if the projection amount T is excessive, a suitable RF output waveform can be obtained, but there is a problem of head wearing.

If the width W of each groove 500 is greater than 0.23 mm, a suitable thickness of the air film AF cannot be ensured in the case of analog recording at a relatively low drum speed, so that the magnetic tape tends to stick to the rotating drum. As a result, a suitable RF output waveform cannot be ensured, and stable running of the magnetic tape cannot be achieved. Thus, a small thickness of the air film AF has adverse effects on drum rotation and tape running to cause a degradation in wow and flutter. Further, a contact pressure between each head and the tape is increased to cause a problem of flaw (scan flaw) on the tape surface.

If the projection amount T of each magnetic head is less than 17 $\mu$m, it is difficult to ensure a stable RF output waveform. Although there is no problem in an initial condition, the service period of each head is reduced. Further, the use environment is also limited.

If the projection amount T of each magnetic head is greater than 23 $\mu$m, a suitable RF output waveform can be ensured, but an impact error may occur and the service life of the head may be reduced. Furthermore, a degradation in wow and flutter may be caused.

The thickness of the air film AF shown in FIG. 10 corresponds to the thickness of an air film AF at a tape inlet 200I of the rotating drum 200 shown in FIG. 15. In general, the thickness of an air film AF1 at a tape outlet 200J of the rotating drum 200 is smaller than the thickness of the air film AF at the tape inlet 200I as shown in FIG. 15. It is accordingly necessary to set the thickness of the air film AF at the tape inlet 200I, so as to ensure a suitable RF output waveform and also ensure running stability of the magnetic tape T2.

FIG. 11 is a bar chart showing RF output waveforms of each magnetic head at the tape inlet 200I with respect to different values of the width W of each groove 500. In FIG. 11, the horizontal axis represents different values of the width W of each groove 500, and the vertical axis represents magnitude of the RF output waveform of each magnetic head at the tape inlet 200I. In this bar chart, the blank bars correspond to the case of rotating the rotating drum 200 at 1800 rpm, and the hatched bars correspond to the case of rotating the rotating drum 200 at 4500 rpm.

The bars (A) in FIG. 11 correspond to the related art, wherein the width W of each groove 500 is considerably small. In this case, the RF output waveform at 1800 rpm is relatively large, but the RF output waveform at 4500 rpm is about 60% of the maximum output, which value is not so satisfactory. The bars (B) in FIG. 11 correspond to a comparison that the width W of each groove 500 is 0.14 mm. In this case, the RF output waveform at 1800 rpm is near 100% as the maximum output, but the RF output waveform at 4500 rpm is as low as about 80% of the maximum output. The bars (C) in FIG. 11 correspond to another comparison that the width W of each groove 500 is 0.18 mm. In this case, the RF output waveform at 1800 rpm is near 100% as the maximum output, but the RF output waveform at 4500 rpm is still about 90% of the maximum output.

In contrast thereto, the bars (D) in FIG. 11 correspond to a preferred embodiment of the present invention wherein the width W of each groove 500 is 0.21 mm. In this case, the RF output waveforms both at 1800 rpm and at 4500 rpm are near 100% as the maximum output.

FIG. 12 is a bar chart showing RF output waveforms of each magnetic head at the tape inlet 200I with respect to different values of the projection amount T of each magnetic head. In FIG. 12, the horizontal axis represents different values of the projection amount T of each magnetic head, and the vertical axis represents magnitude of the RF output waveform of each magnetic head at the tape inlet 200I. In this bar chart, the blank bars correspond to the case that the width W of each groove 500 is 0.18 mm, and the hatched bars correspond to the case that the width W of each groove 500 is 0.21 mm.

The bars (A) in FIG. 12 correspond to a preferred embodiment of the present invention wherein the projection amount T is 20 $\mu$m. In this case, the RF output waveforms in both cases of 0.18 mm and 0.21 mm for the width W are near 100% as the maximum output.

In contrast thereto, the bars (B) in FIG. 12 correspond to a comparison that the projection amount T is 13 $\mu$m. In this case, the RF output waveforms in both cases of 0.18 mm and 0.21 mm for the width W are lower than those of the bars (A) in FIG. 12. The bars (C) in FIG. 12 correspond to another comparison that the projection amount T is 10 $\mu$m. In this case, the RF output waveform in the case of 0.18 mm for the width W is very low, and the RF output waveform in the case of 0.21 mm for the width W is yet considerably low.

FIG. 13 is a graph showing the relation between the thickness ($\mu$m) of the air film AF at the tape inlet 200I and the vertical position on the rotating drum 200 with respect to the head position in the case that the width W of each groove 500 is set to 0.21 mm according to the present invention. In FIG. 13, the solid line P2 corresponds to the case that the rotational speed of the rotating drum 200 is 1800 rpm, and the broken line P1 corresponds to the case that the rotational speed of the rotating drum 200 is 4500 rpm.

Figure 14:
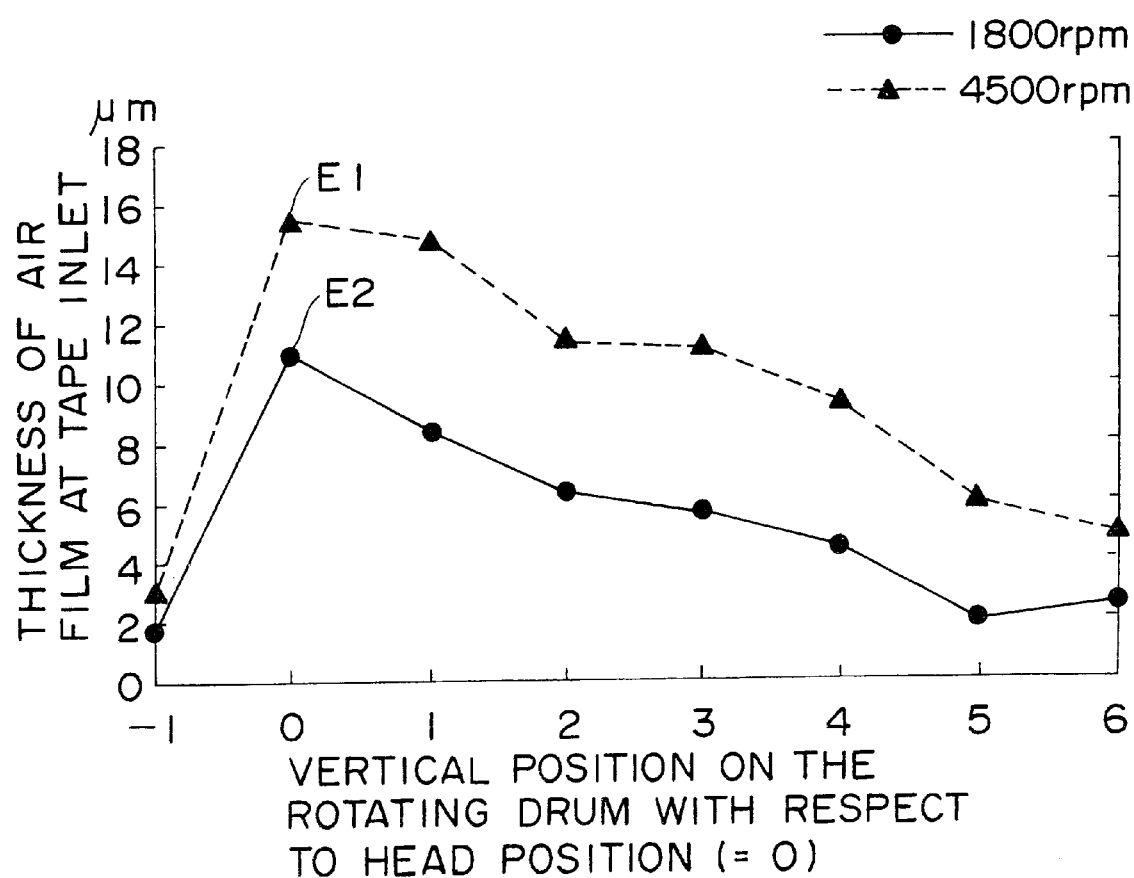
FIG. 14 is a graph similar to FIG. 13, showing a comparison using a smaller width of each groove in the related art 8-mm video tape recorder.

FIG. 14 is a graph similar to FIG. 13, showing a comparison that the width W of each groove 500 is the same as that in the related art 8-mm video tape recorder.

The comparison between the broken line P1 shown in FIG. 13 and the broken line E1 shown in FIG. 14 shows that the thickness of the air film AF at the tape inlet 200I according to the present invention is considerably smaller than that in the related art. The comparison between the solid line P2 shown in FIG. 13 and the solid line E2 shown in FIG. 14 also shows a similar result.

Thus, the thickness of the air film AF at the tape inlet 200I both at 1800 rpm and at 4500 rpm according to the present invention as shown in FIG. 13 is considerably smaller than that in the related art as shown in FIG. 14. Further, suitable values of the thickness of the air film AF can be obtained both at 1800 rpm and at 4500 rpm according to the present invention.

That is, in the case of rotating the rotating drum 200 at 1800 rpm to record/playback an analog signal on/from the magnetic tape T2, a suitable RF output waveform can be ensured and running stability of the magnetic tape T2 can also be ensured. Furthermore, also in the case of rotating the rotating drum 200 at 4500 rpm to record/playback a digital signal on/from the magnetic tape T2, a suitable RF output waveform can be ensured and running stability of the magnetic tape T2 can also be ensured.

In general, the RF output waveform is an important factor. According to the present invention adopting an upper-drum rotating system capable of ensuring the 8-mm format performance having a DV signal record, the width of each groove formed on the upper drum and the projection amount of each video head are predetermined to ensure suitable performances.

In such an upper-drum rotating type magnetic record/playback apparatus, the thickness of an air film generated by rotation of the upper drum in recording or reproduction has a large influence on the performances. In a video tape recorder capable of ensuring the 8-mm format performance (at 1800 rpm for the drum speed) and changing the drum speed to 4500 rpm for DV signal recording/reproduction, the number of grooves formed on the upper drum is set to 3 and the width of each groove is set to 0.21 mm in a preferred embodiment of the present invention, thereby limiting the thickness of the air film to suitable values both at 1800 rpm and at 4500 rpm. As a result, a suitable RF output waveform and running stability of the video tape can be ensured at each drum speed.

Moreover, the projection amount of each video head also has a large influence on the performances. In a preferred embodiment of the present invention, the projection amount of each video head from the outer circumferential surface of the rotating drum is set to 20 $\mu$m, so as to satisfy the performances both at 1800 rpm and at 4500 rpm for the drum speed in the case that the number of the grooves is set to 3 and the width of each groove is set to 0.21 mm.

Figure 16:
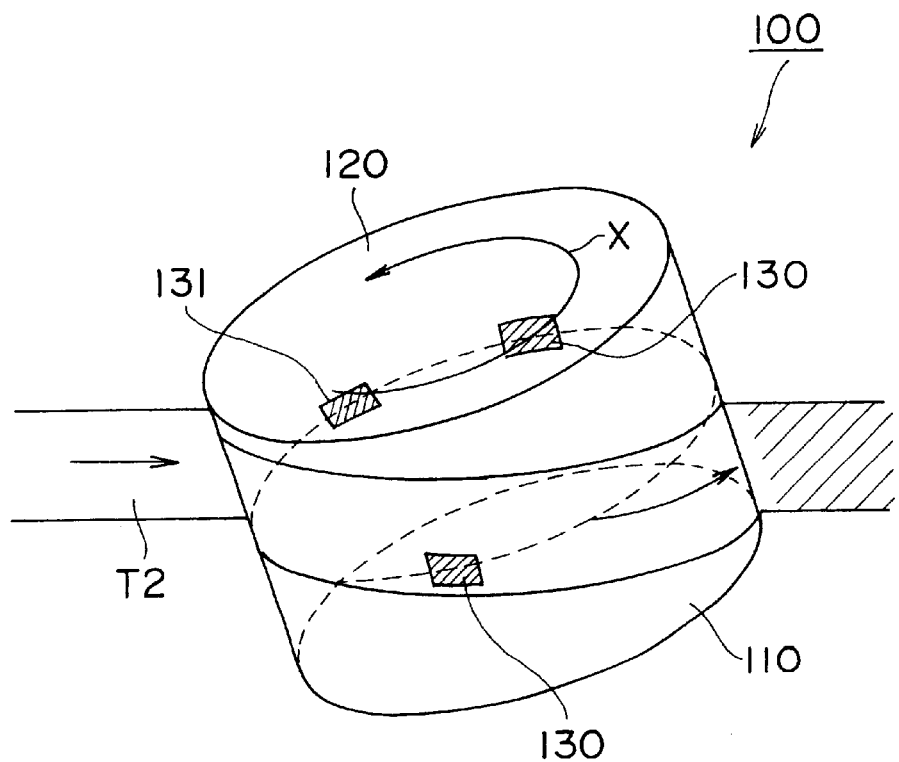
FIG. 16 is a schematic perspective view of a rotary drum unit according to another preferred embodiment of the present invention.

FIG. 16 is a schematic perspective view of a rotary drum unit 100 according to another preferred embodiment of the present invention. A magnetic tape T2 having a tape width of 8 mm as the magnetic recording medium is wrapped around the rotary drum unit 100.

The rotary drum unit 100 has a fixed drum 110 and a rotating drum 120 placed on the upper surface of the fixed drum 110 so as to be rotated relative thereto. A pair of magnetic record/playback heads 130 for recording/ reproducing information in the form of digital signals onto/ from the magnetic tape T2 are provided on the outer circumferential surface of the rotating drum 120 at circumferentially opposite positions.

An erase head 131 for erasing information recorded on the magnetic tape T2 is also provided on the outer circumferential surface of the rotating drum 120.

Figure 17:
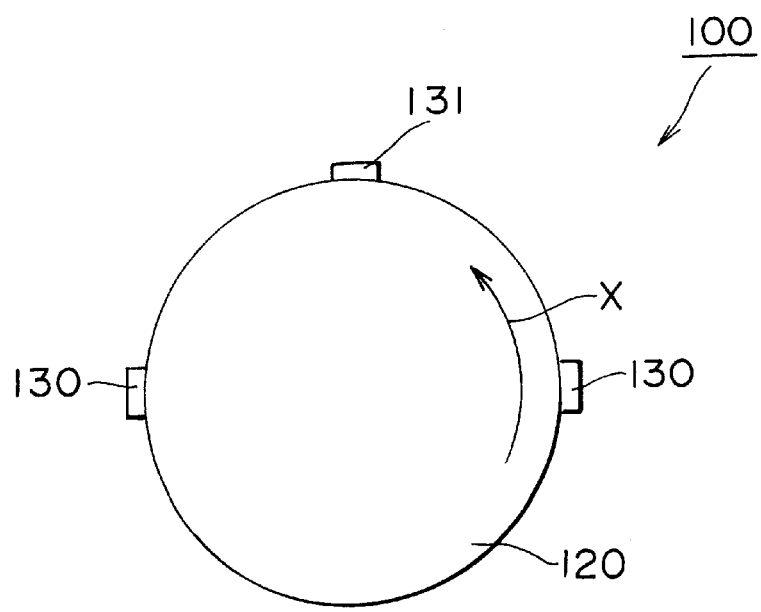
FIG. 17 is a schematic plan view of the rotary drum unit shown in FIG. 16, showing the positions of two record/playback heads and an erase head.

As shown in FIG. 17, the two magnetic record/playback heads 130 are spaced circumferentially 180° apart from each other, and the erase head 131 is positioned between the magnetic record/playback heads 130.

During rotation of the rotating drum 120, the magnetic record/playback heads 130 and the erase head 131 come into contact with the magnetic tape T2 as shown in FIG. 16.

The rotating drum 120 is rotated in a direction of arrow X shown in FIGS. 16 and 17. In one revolution of the rotating drum 120, the erase head 131 precedes the magnetic record/ playback heads 130 to come into contact with the magnetic tape T2. The rotational speed of the rotating drum 120 is set to 4500 rpm.

Figure 18:
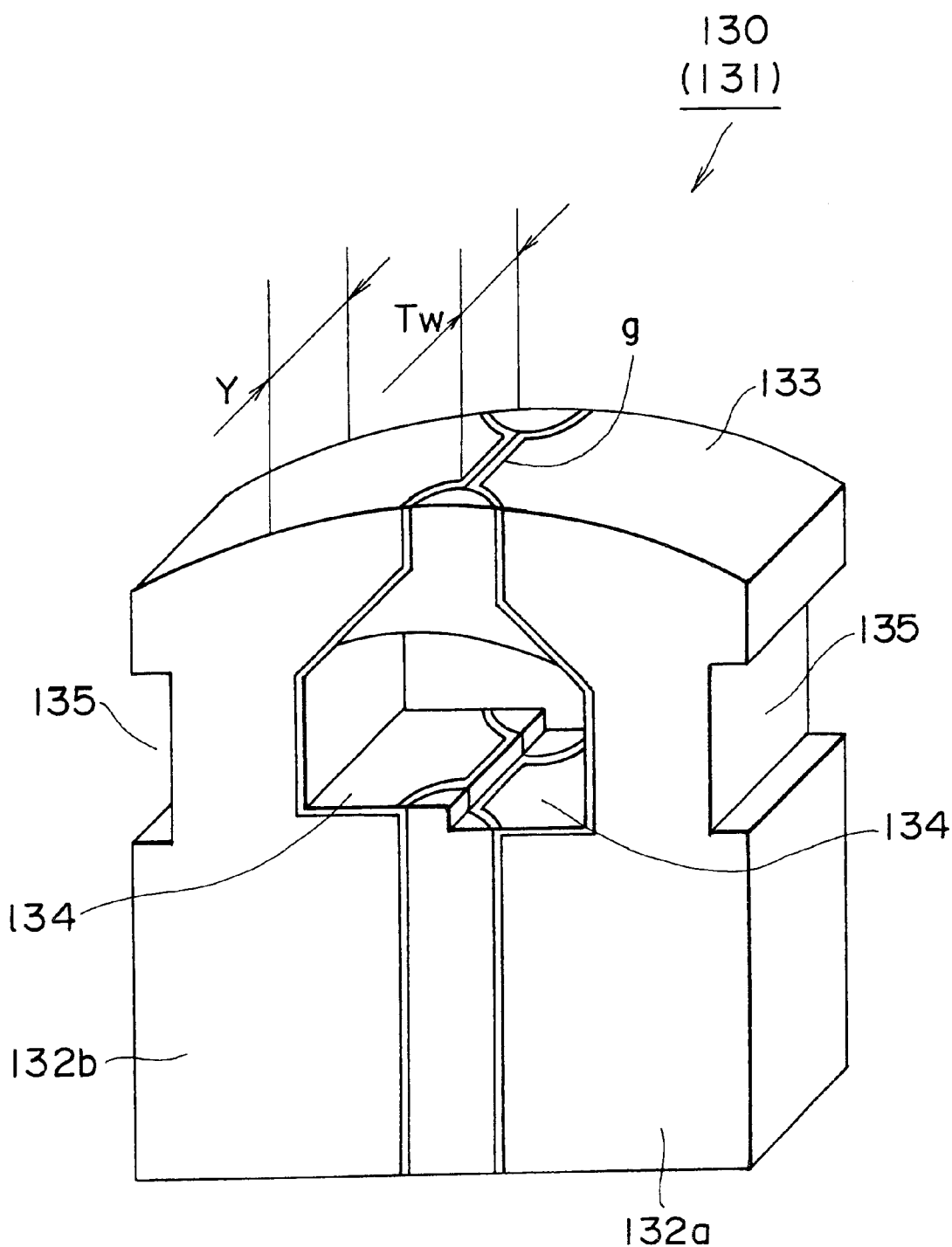
FIG. 18 is a schematic perspective view of a magnetic head used as the record/playback heads and the erase head shown in FIG. 16.

FIG. 18 is a schematic perspective view of a magnetic head used as the magnetic record/playback heads 130 and the erase head 131.

As shown in FIG. 18, the magnetic head is composed generally of a pair of core half blocks 132a and 132b butted together. Each of the core half blocks 132a and 132b is formed of a magnetic material such as MnZn ferrite. By butting the core half blocks 132a and 132b as shown, a tape sliding surface 133 is formed on the upper surfaces of the core half blocks 132a and 132b as viewed in FIG. 18, so that the magnetic tape T2 comes into sliding contact with the tape sliding surface 133.

The tape sliding surface 133 is formed with a gap g having a length corresponding to a track width TW of the magnetic tape T2. The gap g is formed by butt-joining the core half blocks 132a and 132b through a fused glass material or the like as a gap material. A magnetic field is generated in the vicinity of the gap g to thereby record/reproduce information on/from the magnetic tape T2 or erase information recorded on the magnetic tape T2.

Each of the core half blocks 132a and 132b is formed with a coil mount groove 134 and a coil guide groove 135 for winding a coil (not shown) These grooves 134 and 135 are formed below the tape sliding surface 133.

In the case of using the magnetic head shown in FIG. 18 as one of the magnetic record/playback heads 130 for recording, the coil mount groove 134 and the coil guide groove 135 are wounded with a coil, and an electric current is passed through the coil in a given direction to thereby generate a magnetic field at the gap g, thus recording information on the magnetic tape T2.

In the case of using the magnetic head shown in FIG. 18 as the other of the magnetic record/playback heads 130 for reproduction, no electric current is passed through the coil, but a magnetic field is received from the magnetic tape T2 to generate an electric current in the coil, thereby reproducing information from this electric current.

In the case of using the magnetic head shown in FIG. 18 as the erase head 131, an electric current is passed through the coil in a direction opposite to that for recording, thereby erasing information recorded on the magnetic tape T2 through the gap g.

Thus, the magnetic record/playback heads 130 and the erase head 131 have similar configurations. In this preferred embodiment, however, the tape sliding surface 133 of the erase head 131 is different from that of each magnetic record/playback head 130. More specifically, a head width Y as the width of the tape sliding surface 133 of the erase head 131 is larger than that of each magnetic record/playback head 130.

Preferably, the head width Y of the erase head 131 is set to about 1.2 times larger than the head width Y of each magnetic record/playback head 130.

The two magnetic record/playback heads 130 and the erase head 131 as configured above are mounted on the rotating drum 120 as shown in FIG. 17.

The rotating drum 120 is rotated at a constant speed of 4500 rpm, for example, and the two magnetic record/ playback heads 130 and the erase head 131 mounted on the rotating drum 120 come into contact with the magnetic tape T2 wrapped around the rotating drum 120.

As mentioned above, the magnetic tape T2 is a magnetic tape having a tape width of 8 mm, and information is recorded in the form of digital signals on the magnetic tape T2.

Figure 19:
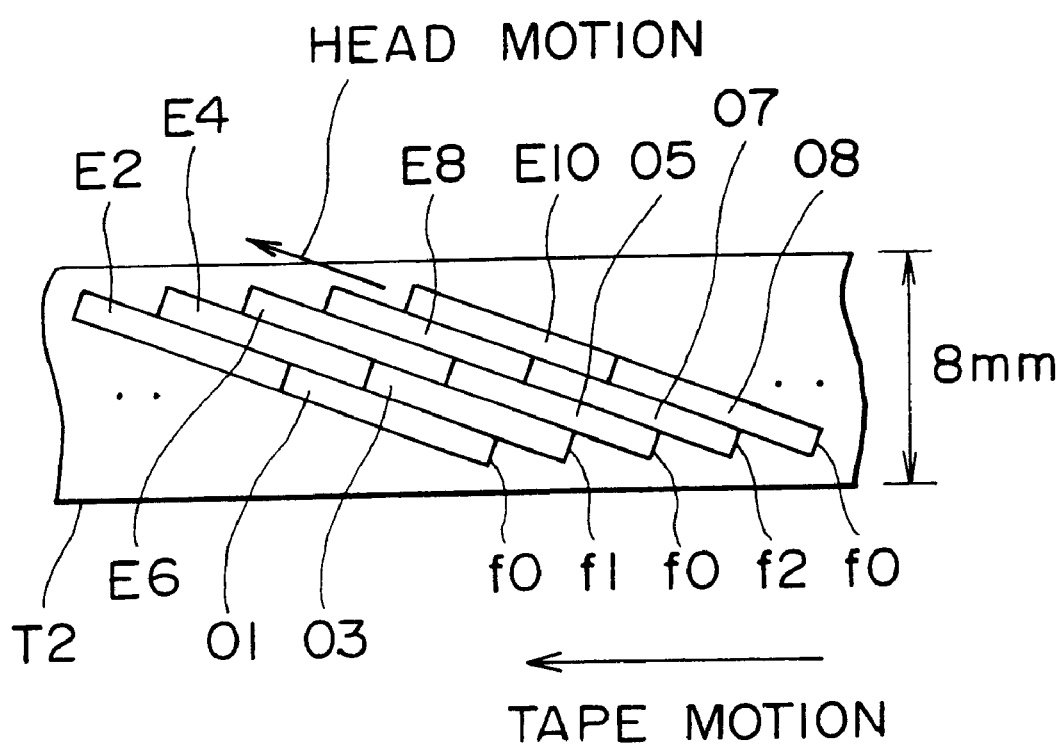
FIG. 19 is a schematic illustration of a magnetic tape on which information is recorded in the form of digital signals according to the present invention.

FIG. 19 shows the magnetic tape T2 on which information is recorded in the form of digital signals. As shown in FIG. 19, the magnetic tape T2 is a magnetic tape having a tape width of 8 mm, and information is recorded in the form of digital signals on the magnetic tape T2. This 8-mm magnetic tape T2 is the same as a magnetic tape used in the related art analog signal recording format. Accordingly, by applying the 8-mm magnetic tape T2 to a digital signal recording format, existing resources including the production facilities and parts of related art 8-mm video tape can be effectively used.

In the digital 8-mm format shown in FIG. 19, the gaps g of the two magnetic record/playback heads 130 have different azimuth angles. Further, each magnetic record/playback head 130 slides on the magnetic tape T2 in a direction inclined by a given angle with respect to a feeding direction of the magnetic tape T2. Accordingly, a track pattern as shown in FIG. 19 is formed on the magnetic tape T2.

In this digital 8-mm format, two tracks of digital data are recorded on one track. That is, two tracks to be recorded on another type of magnetic tape having a tape width of 6.35 mm are recorded on one track of the 8-mm magnetic tape T2.

More specifically, as shown in FIG. 19, an odd track O1 to be recorded by one of the two magnetic record/playback heads 130 and an even track E2 to be recorded by the other magnetic record/playback head 130 are continuously arranged as one track. Similarly, an odd track O3 and an even track E4 are continuously arranged as one track; an odd track O5 and an even track E6 are continuously arranged as one track; an odd track O7 and an even track E8 are continuously arranged as one track; and an odd track O9 and an even track E10 are continuously arranged as one track.

In this case, one frame of digital video signal conforming to the NTSC (National Television System Committee) format is recorded on the totally ten tracks, or the sum of the five odd tracks O1 to O9 and the five even tracks E2 to E10. Meanwhile, in the PAL (Phase Alternation by Line) format, one frame of digital video signal is recorded on totally twelve tracks, or the sum of six odd tracks and six even tracks.

Accordingly, one frame of digital video signal conforming to the NTSC format is recorded on five tracks of the 8-mm magnetic tape T2. Further, one frame of digital video signal conforming to the PAL format is recorded on six tracks of the 8-mm magnetic tape T2.

By recording such a digital video signal on the related art 8-mm magnetic tape T2, the number of tracks required to record the digital video signal can be reduced to about ½ as compared with the case of recording the same digital video signal on the respective odd tracks O1 to O9 and the respective even tracks E2 to E10.

In recording a digital video signal on the 8-mm magnetic tape T2, the rotating drum 120 having the two magnetic record/playback heads 130 and the erase head 131 coming into contact with the magnetic tape T2 is rotated at 4500 rpm, for example. Accordingly, as compared with the case of recording an analog video signal at 1800 rpm in the related art, the rotational speed of the rotating drum 120 is remarkably increased.

As a result, the magnetic record/playback heads 130 and the erase head 131 come into contact with the magnetic tape T2 much more times than it used to be, causing an increase in wear of each head. In particular, since the erase head 131 precedes the magnetic record/playback heads 130 in one revolution of the rotating drum 120 to come into contact with the magnetic tape T2, the wear of the erase head 131 by the magnetic tape T2 becomes greater than that of each magnetic record/playback head 130.

As mentioned above, the head width Y (see FIG. 18) of the erase head 131 is about 1.2 times larger than the head width Y of each magnetic record/playback head 130. With this configuration, a normal wear of 10 μm with a coercive force of 1000 H can be achieved.

This feature will now be described more specifically with reference to FIG. 20, which shows the dependence of a head wear upon an erase head width, that is, the relation between the wear of the erase head and the ratio of the erase head width to each record/playback head width.

Figure 20:
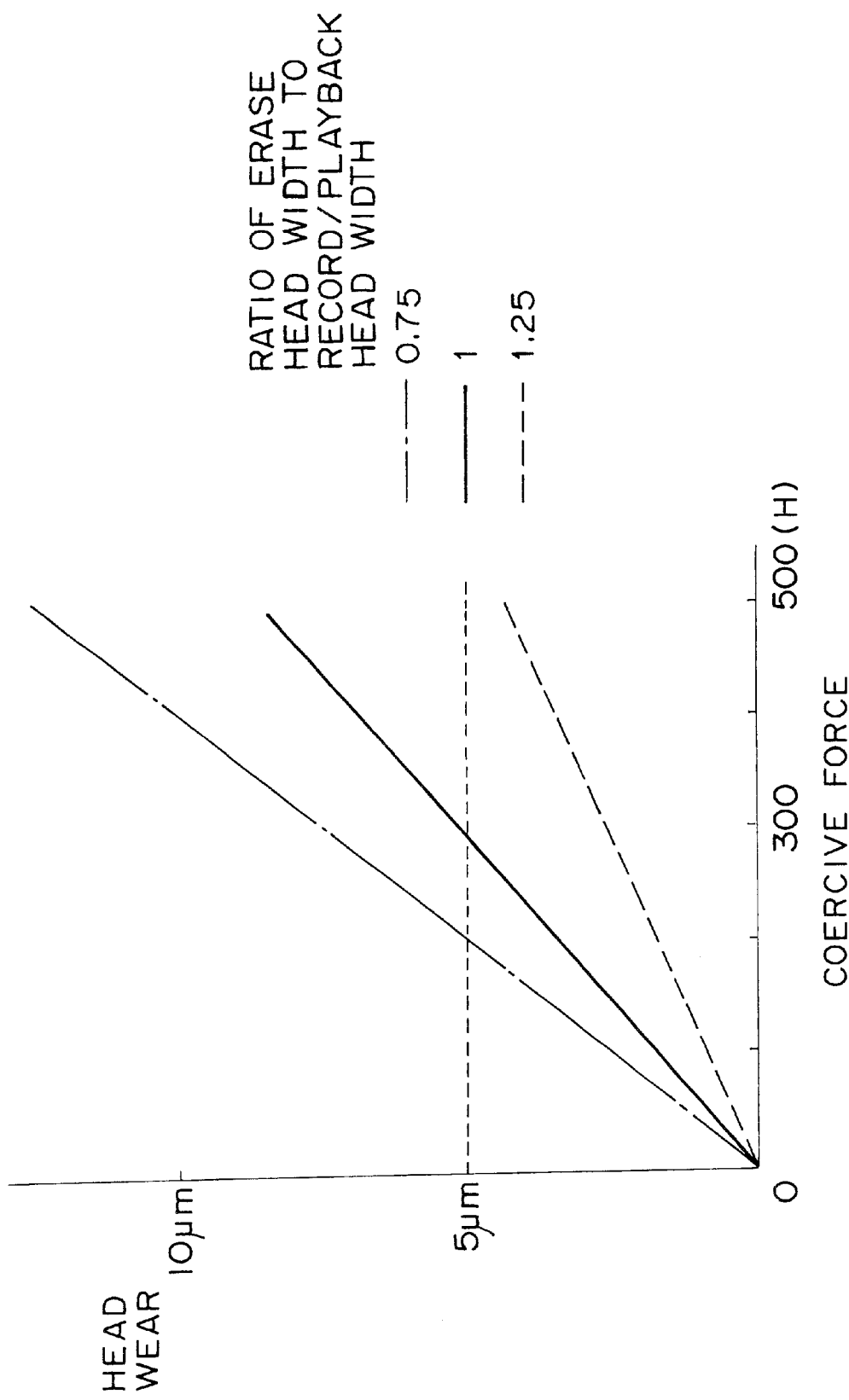
FIG. 20 is a graph showing the dependence of a head wear upon an erase head width.

As apparent from FIG. 20, in the case that the head width Y of the erase head 131 is set to 0.75 times smaller than the head width Y of each magnetic record/playback head 130 as shown by a dot-dash line, the wear of the erase head 131 is 12.1 μm with a coercive force of 500 H, which value is much larger than the normal wear, 5 μm. In the case that the head width Y of the erase head 131 is set to equal to, or 1 time of the head width Y of each magnetic record/playback head 130 as shown by a solid line, the wear of the erase head 131 is 8.3 μm with a coercive force of 500 H, which value is yet greater than the normal wear, 5 μm.

To the contrary, in the case that the head width Y of the erase head 131 is set to 1.25 times larger than the head width Y of each magnetic record/playback head 130 as shown by a broken line, the wear of the erase head 131 is 4.2 μm with a coercive force of 500 H, which value is smaller than the normal wear, 5 μm.

As mentioned above, the target value of the wear of the erase head 131 is 10 μm with a coercive force of 1000 H, which can be converted into 5 μm with a coercive force of 500 H. To achieve this target value, 5 μm, of the wear with a coercive force of 500 H, it is sufficient to set the ratio of the head width Y of the erase head 131 to the head width Y of each magnetic record/playback head 130 to an intermediate value between 1.25 and 1.

In considering an equation of y=ax+b where x stands for the ratio of the erase head width to each record/playback head width, and y stands for the wear of the erase head. By inserting x=1, y=8.3 and x=1.25, y=4.2 into the above equation, the coefficients a and b can be obtained as a=−16.4 and b=24.7.

Accordingly, in the case that the wear (y) of the erase head 131 is 5 μm as the target value with a coercive force of 500 H, the ratio (x) of the erase head 131 to each magnetic record/playback head 130 is calculated to about 1.2 by inserting y=5 into the equation y=−16.4x+24.7 obtained above.

Thus, the head width Y of the erase head 131 of the rotating drum 120 is set to about 1.2 times larger than the head width Y of each magnetic record/playback head 130 in this preferred embodiment. Accordingly, it is possible to prevent that the erase head 131 may be worn earlier than each magnetic record/playback head 130, thereby extending the service life of the rotary drum unit 100.

Figure 21:
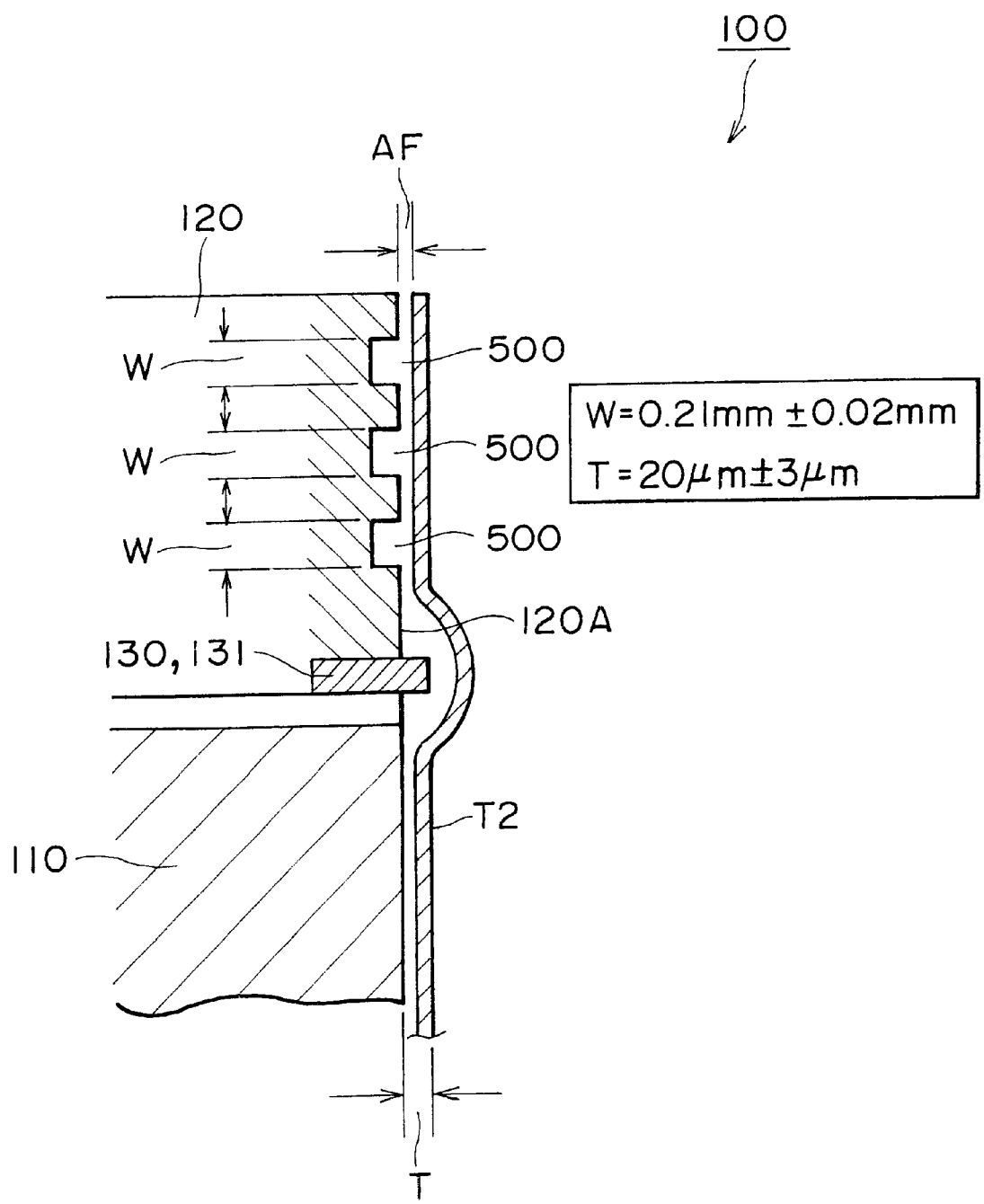
FIG. 21 is an enlarged sectional view of an essential part of the rotary drum unit shown in FIG. 16.

Referring next to FIG. 21, there is shown an enlarged sectional view of an essential part of the rotary drum unit 100 including the rotating drum 120, the fixed drum 110, the two magnetic record/playback heads 130, and the erase head 131 (one of these heads 130 and 131 being shown). As shown in FIG. 21, a plurality of (e.g., three as shown in this preferred embodiment) grooves 500 are formed on an outer circumferential (cylindrical) surface 120A of the rotating drum 120 so as to extend in the direction of rotation of the rotating drum 120. In this preferred embodiment, all the grooves 500 have the same width W, and they are formed in parallel at equal intervals.

Each of the magnetic record/playback heads 130 and the erase head 131 is fixed to the rotating drum 120 so as to project by an amount T from the outer circumferential surface 120A of the rotating drum 120. An air film AF is formed between the outer circumferential surface 120A of the rotating drum 120 and the magnetic tape T2 by the rotation of the rotating drum 120. By maintaining the thickness of the air film AF to a suitable value, a suitable RF output waveform in each magnetic record/playback head 130 can be ensured. Further, the width W of each groove 500 is set to fall within a given range, and the projection amount T of each of the magnetic record/playback heads 130 and 131 is set to fall within a given range, so as to ensure stable running of the magnetic tape T2.

The rotary drum unit 100 in this preferred embodiment is configured to allow not only recording and reproduction of a digital video signal as mentioned above, but also recording and reproduction of an analog video signal.

More specifically, in the case of recording or reproducing a digital signal, the rotating drum 120 is rotated at 4500 rpm, whereas in the case of recording or reproducing an analog signal, the rotating drum 120 is rotated at 1800 rpm.

To maintain the thickness of the air film AF to a suitable value during rotation of the rotating drum 120 at such different rotational speeds, the width W of each groove 500 formed on the rotating drum 120 is set within a given range of 0.21 mm±0.02 mm.

Further, the projection amount T of each of the magnetic record/playback heads 130 and the erase head 131 is set within a given range of 20 μm±3 μm.

The reason for the above given ranges of the width W and the projection amount T will now be described.

If the width W of each groove 500 is less than 0.19 mm, the thickness of the air film AF cannot be maintained to a suitable value in the case of rotating the rotating drum 120 at 4500 rpm. On the other hand, if the width W of each groove 500 is greater than 0.23 mm, the thickness of the air film AF cannot be maintained to a suitable value also in the case of rotating the rotating drum 120 at 1800 rpm.

Particularly, a small thickness of the air film AF has adverse effects on rotation of the rotating drum 120 and feeding of the magnetic tape T2 to cause a degradation in wow and flutter. Further, a contact pressure between each of the magnetic record/playback heads 130 and 131 and the magnetic tape T2 is increased to cause a problem of flaw (scan flaw) on the recording surface of the magnetic tape T2.

If the projection amount T of each of the magnetic record/playback heads 130 and 131 is less than 17 μm, it is difficult to ensure a suitable RF output waveform. On the other hand, if the projection amount T of each of the magnetic record/playback heads 130 and 131 is greater than 23 μm, a so-called impact error may occur and the service life of each head may be reduced. Furthermore, a degradation in wow and flutter may also be caused.

Figure 26:
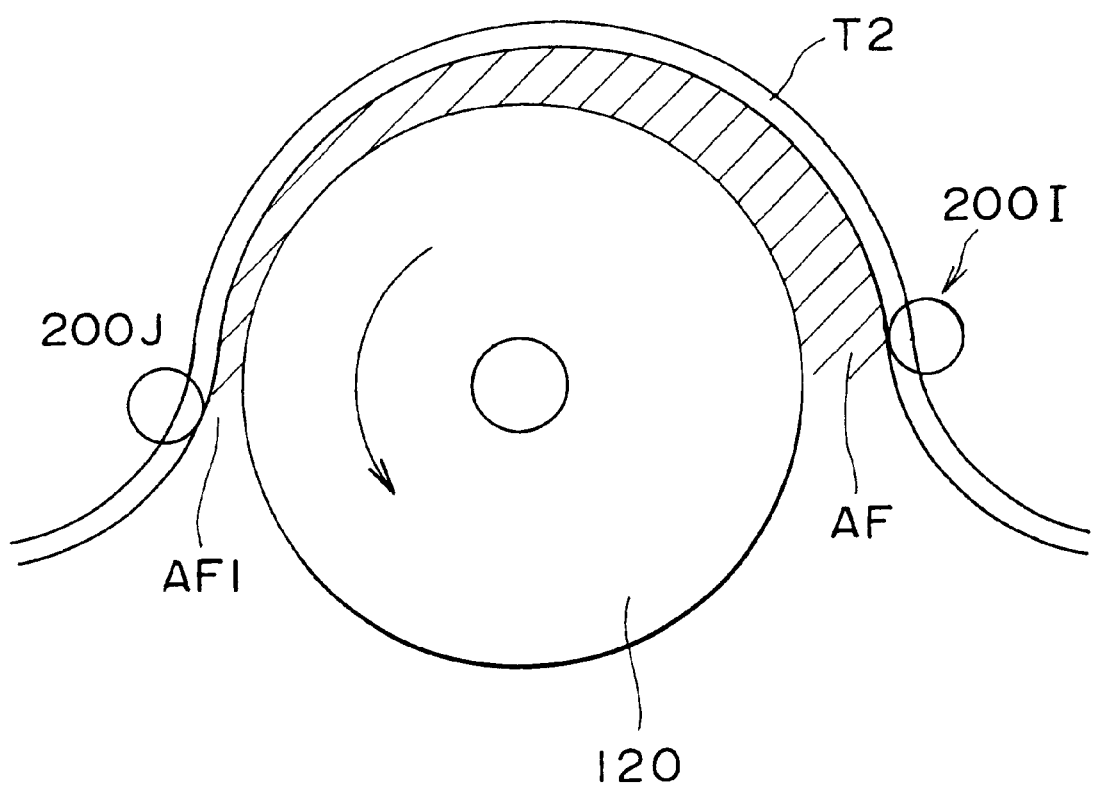
FIG. 26 is a schematic plan view for illustrating a difference in thickness between an air film at a tape inlet of the rotating drum and an air film at a tape outlet of the rotating drum.

The thickness of the air film AF shown in FIG. 21 corresponds to the thickness of an air film AF at a tape inlet 200I of the rotating drum 120 shown in FIG. 26. In general, the thickness of an air film AF1 at a tape outlet 200J of the rotating drum 200 is smaller than the thickness of the air film AF at the tape inlet 200I as shown in FIG. 26. It is accordingly necessary to set the thickness of the air film AF at the tape inlet 200I as shown in FIG. 21, so as to ensure a suitable RF output waveform and also ensure running stability of the magnetic tape T2.

Figure 22:
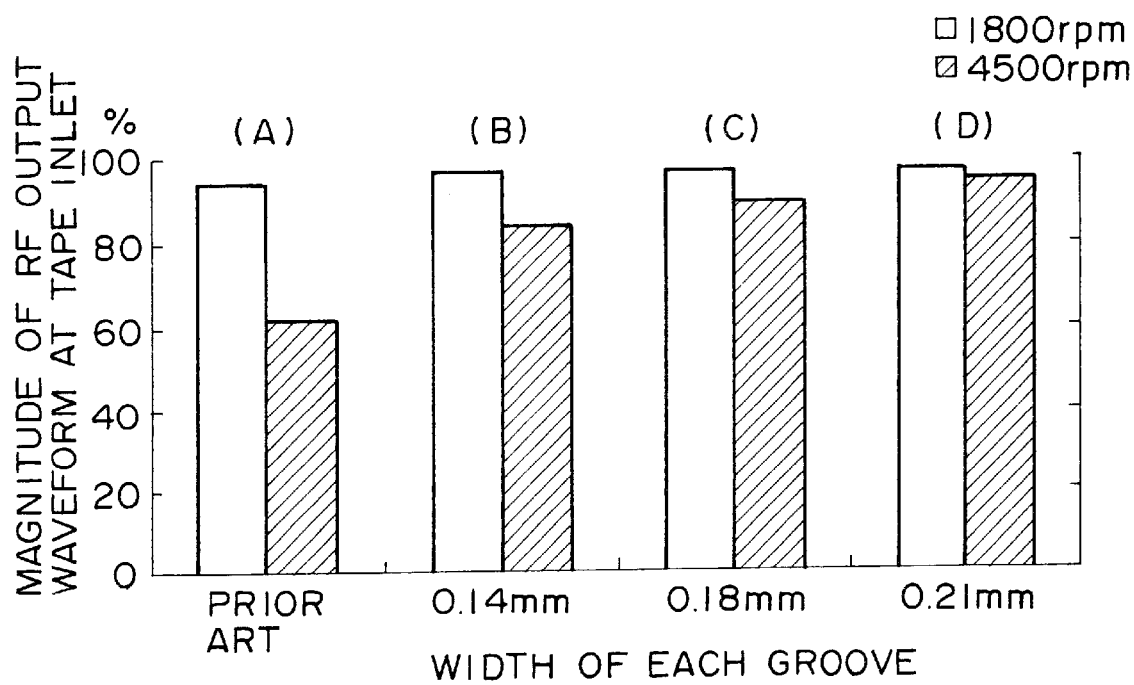
FIG. 22 is a graph showing the relation between the width of each groove formed on the rotating drum and the magnitude of an RF output waveform.

FIG. 22 is a bar chart showing RF output waveforms of each magnetic head at the tape inlet 200I with respect to different values of the width W of each groove 500. In FIG. 22, the horizontal axis represents different values of the width W of each groove 500, and the vertical axis represents magnitude of the RF output waveform of each magnetic head at the tape inlet 200I. In this bar chart, the blank bars correspond to the case of rotating the rotating drum 120 at 1800 rpm, and the hatched bars correspond to the case of rotating the rotating drum 120 at 4500 rpm.

The bars (A) in FIG. 22 correspond to the related art, wherein the width W of each groove 500 is considerably small. In this case, the RF output waveform at 1800 rpm is relatively large, but the RF output waveform at 4500 rpm is about 60% of the maximum output, which value is not so satisfactory. The bars (B) in FIG. 22 correspond to a comparison that the width W of each groove 500 is 0.14 mm. In this case, the RF output waveform at 1800 rpm is near 100% as the maximum output, but the RF output waveform at 4500 rpm is as low as about 80% of the maximum output. The bars (C) in FIG. 22 correspond to another comparison that the width W of each groove 500 is 0.18 mm. In this case, the RF output waveform at 1800 rpm is near 100% as the maximum output, but the RF output waveform at 4500 rpm is still about 90% of the maximum output.

In contrast thereto, the bars (D) in FIG. 22 correspond to a preferred embodiment of the present invention wherein the width W of each groove 500 is 0.21 mm. In this case, the RF output waveforms both at 1800 rpm and at 4500 rpm are near 100% as the maximum output.

Figure 23:
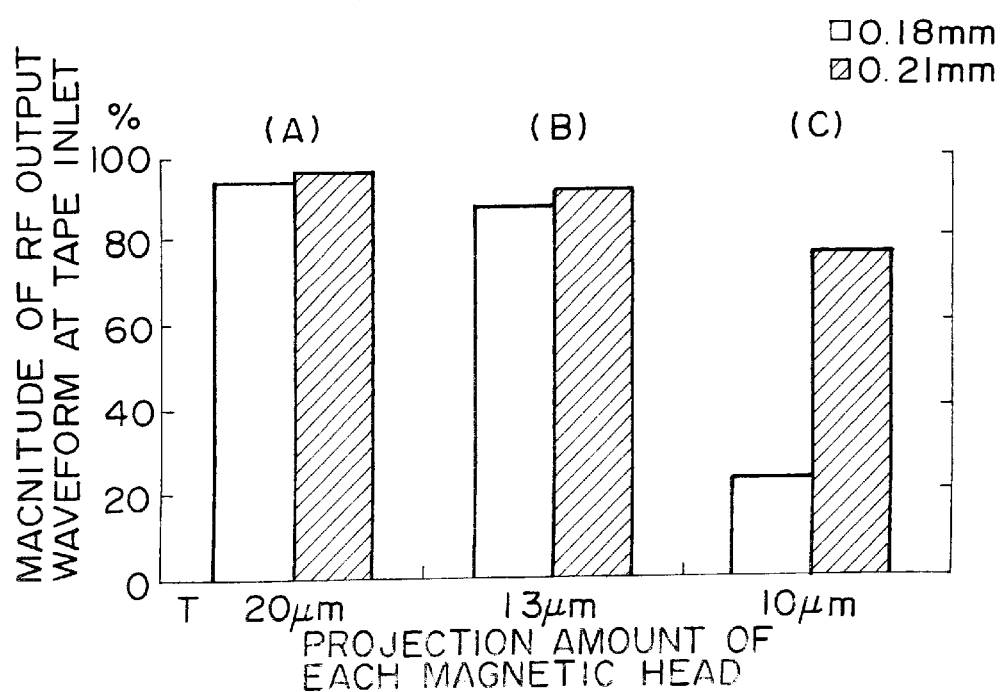
FIG. 23 is a graph showing the relation between the projection amount of each magnetic head and the magnitude of an RF output waveform.

FIG. 23 is a bar chart showing RF output waveforms of each magnetic head at the tape inlet 200I with respect to different values of the projection amount T of each magnetic head. In FIG. 23, the horizontal axis represents different values of the projection amount T of each magnetic head, and the vertical axis represents magnitude of the RF output waveform of each magnetic head at the tape inlet 200I. In this bar chart, the blank bars correspond to the case that the width W of each groove 500 is 0.18 mm, and the hatched bars correspond to the case that the width W of each groove 500 is 0.21 mm.

The bars (A) in FIG. 23 correspond to a preferred embodiment of the present invention wherein the projection amount T is 20 μm. In this case, the RF output waveforms in both cases of 0.18 mm and 0.21 mm for the width W are near 100% as the maximum output.

In contrast thereto, the bars (B) in FIG. 23 correspond to a comparison that the projection amount T is 13 μm. In this case, the RF output waveforms in both cases of 0.18 mm and 0.21 mm for the width W are lower than those of the bars (A) in FIG. 23. The bars (C) in FIG. 23 correspond to another comparison that the projection amount T is 10 μm. In this case, the RF output waveform in the case of 0.18 mm for the width W is very low, and the RF output waveform in the case of 0.21 mm for the width W is yet considerably low.

Figure 24:
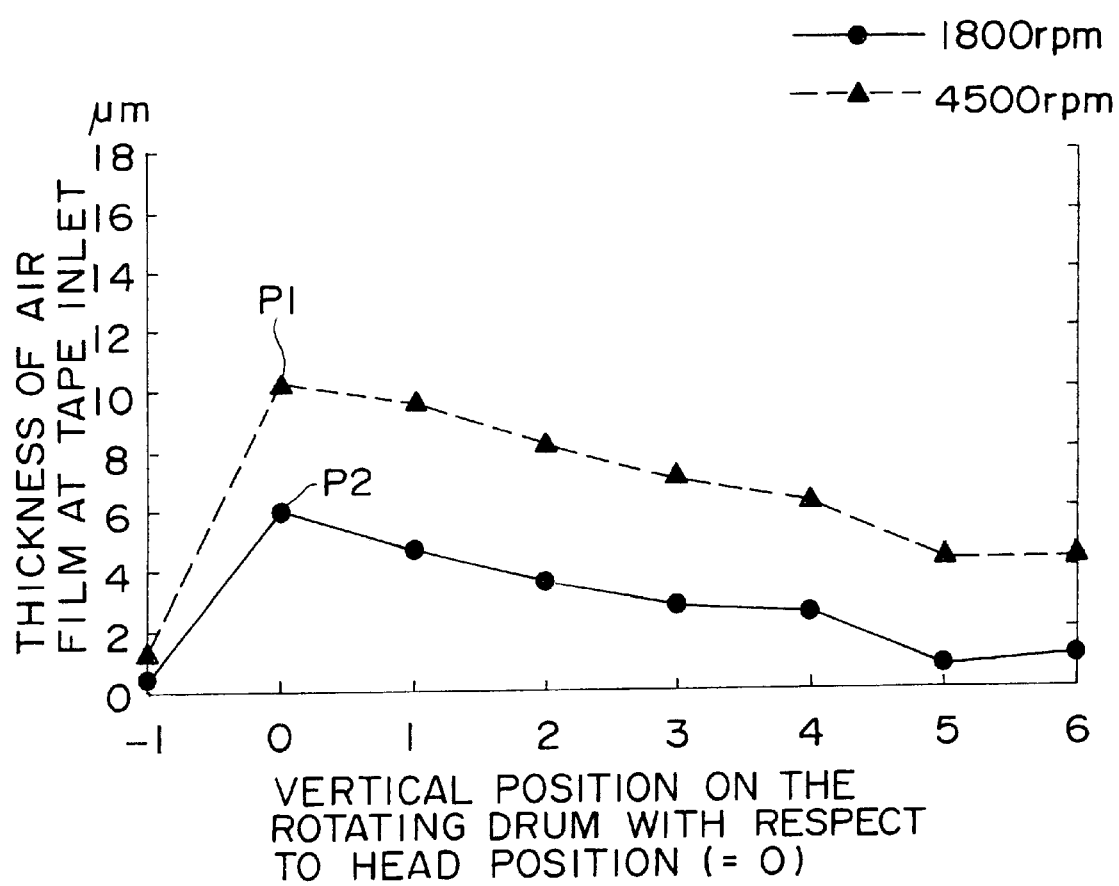
FIG. 24 is a graph showing the thickness of an air film formed between the rotating drum and the magnetic tape in the second preferred embodiment of the present invention.

FIG. 24 is a graph showing the relation between the thickness (μm) of the air film AF at the tape inlet 200I and the vertical position on the rotating drum 120 with respect to the head position in the case that the width W of each groove 500 is set to 0.21 mm according to the present invention. In FIG. 24, the solid line P2 corresponds to the case that the rotational speed of the rotating drum 120 is 1800 rpm, and the broken line P1 corresponds to the case that the rotational speed of the rotating drum 120 is 4500 rpm.

Figure 25:
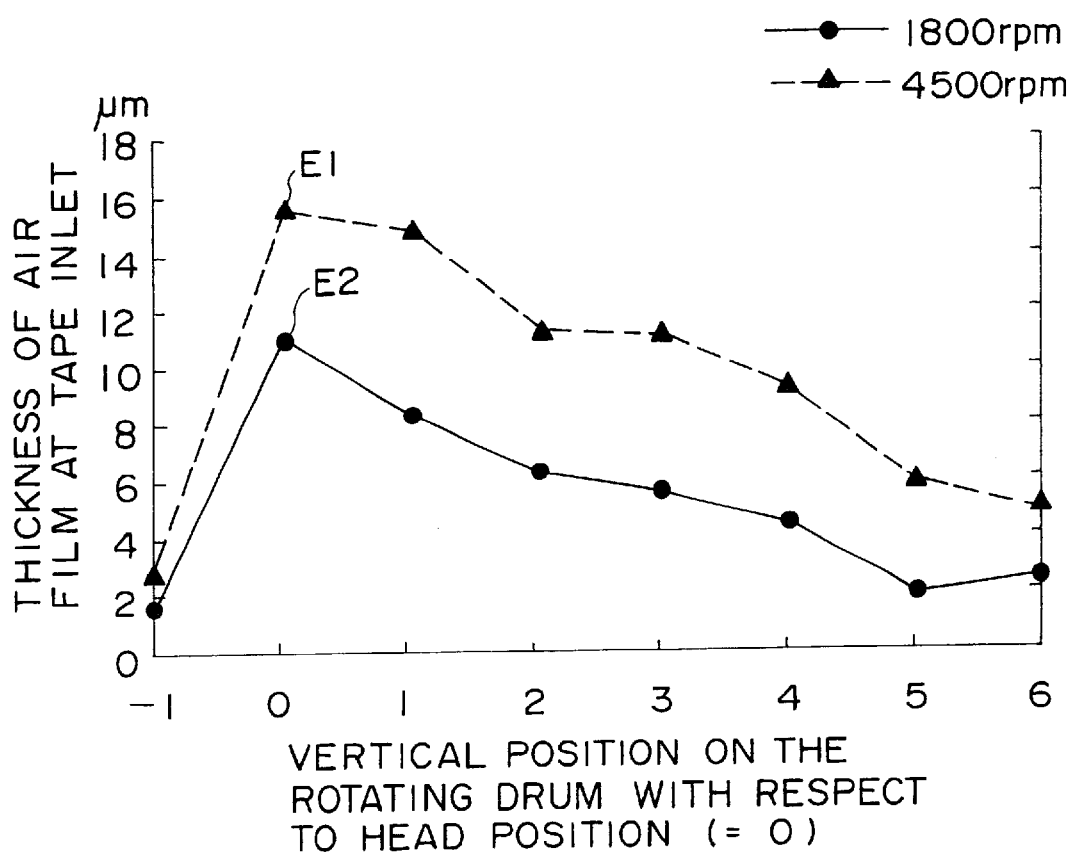
FIG. 25 is a graph showing a comparison using a smaller width of each groove in the related art 8-mm video tape recorder.

FIG. 25 is a graph similar to FIG. 24, showing a comparison that the width W of each groove 500 is the same as that in the related art 8-mm video tape recorder.

The comparison between the broken line P1 shown in FIG. 24 and the broken line E1 shown in FIG. 25 shows that the thickness of the air film AF at the tape inlet 200I according to the present invention is considerably smaller than that in the related art. The comparison between the solid line P2 shown in FIG. 24 and the solid line E2 shown in FIG. 25 also shows a similar result.

Thus, the thickness of the air film AF at the tape inlet 200I both at 1800 rpm and at 4500 rpm according to the present invention as shown in FIG. 24 is considerably smaller than that in the related art as shown in FIG. 25. Further, suitable values of the thickness of the air film AF can be obtained both at 1800 rpm and at 4500 rpm according to the present invention.

Consequently, by setting the width W of each groove 500 formed on the rotating drum 120 within the range of 0.21 mm±0.02 mm and setting the projection amount T of each of the magnetic record/playback heads 130 and the erase head 131 within the range of 20 μm±3 μm as mentioned above, the thickness of the air film AF formed on the rotating drum 120 adapted to be rotated at different rotational speeds can be maintained to a suitable value, and a stable RF output waveform can be ensured.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magnetic record/playback apparatus for continuously recording at least two tracks of data conforming to a digital recording format applied to a first magnetic tape having a first tape width onto one track formed on a second magnetic tape having a second tape width larger than said first tape width, and for reproducing said data from said second magnetic tape, comprising:

a fixed drum; and a rotating drum adapted to be rotated relative to said fixed drum, said rotating drum having a magnetic head for recording said data onto said second magnetic tape and for reproducing said data from said second magnetic tape;

said rotating drum having an outer circumferential surface formed with three equally spaced grooves extending in a direction of rotation of said rotating drum, each of said grooves having a width of 0.21 mm±0.02 mm, whereby a maximum output waveform of close to 100% is achieved when the rotating drum rotates at a speed of 1800 rpm and at a speed of 4500 rpm.

2. A magnetic record/playback apparatus according to claim 1, wherein said magnetic head projects from said outer circumferential surface of said rotating drum by an amount of 20 μm±3 μm.

3. A magnetic record/playback apparatus according to claim 2, wherein:

said first tape width is 6.35 mm;

said second tape width is 8 mm;

said rotating drum is rotated at 4500 rpm in the case of recording said data conforming to said digital recording format onto said second magnetic tape; and said rotating drum is rotated at 1800 rpm in the case of recording analog data on said second magnetic tape by using said magnetic head.

4. A magnetic record/playback apparatus comprising:

a fixed drum; and a rotating drum adapted to be rotated relative to said fixed drum, said rotating drum having a magnetic record/playback head for recording and/or reproducing information in the form of digital signals with respect to a magnetic recording medium, and an erase head for erasing information recorded on said magnetic recording medium;

said erase head having a head width measured in a direction perpendicular to a direction of rotation of said rotating drum, said head width of said erase head being larger than that of said magnetic record/playback head; and whereby said rotating drum has an outer circumferential surface formed with three equally spaced grooves extending in a direction of rotation of said rotating drum, each of said grooves having a width of 0.21 mm±0.02 mm whereby a maximum output waveform of close to 100% is achieved when the rotating drum rotates at a speed of 1800 rpm and at a speed of 4500 rpm.

5. A magnetic record/playback apparatus according to claim 4, wherein said head width of said erase head is set to about 1.2 times larger than that of said magnetic record/playback head.

6. A magnetic record/playback apparatus according to claim 4, wherein said magnetic record/playback head projects from an outer circumferential surface of said rotating drum by an amount of 20 μm±3 μm.

* * * * *